United States Patent
Lu et al.

(10) Patent No.: US 10,964,084 B2
(45) Date of Patent: Mar. 30, 2021

(54) GENERATING REALISTIC ANIMATIONS FOR DIGITAL ANIMATION CHARACTERS UTILIZING A GENERATIVE ADVERSARIAL NETWORK AND A HIP MOTION PREDICTION NETWORK

(71) Applicant: Adobe Inc., San Jose, CA (US)

(72) Inventors: Jingwan Lu, Santa Clara, CA (US); Yi Zhou, Los Angeles, CA (US); Connelly Barnes, Seattle, WA (US); Jimei Yang, Merced, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/451,813

(22) Filed: Jun. 25, 2019

(65) Prior Publication Data

US 2020/0410736 A1 Dec. 31, 2020

(51) Int. Cl.
*G06T 13/00* (2011.01)
*G06T 13/80* (2011.01)
*G06F 17/16* (2006.01)
*G06N 3/04* (2006.01)

(52) U.S. Cl.
CPC ............ *G06T 13/80* (2013.01); *G06F 17/16* (2013.01); *G06N 3/0454* (2013.01)

(58) Field of Classification Search
CPC ......... G06T 13/40; G06T 13/00; G06T 13/80; G06T 13/20; A63F 13/10
USPC ....................................................... 345/473
See application file for complete search history.

(56) References Cited

U.S. PATENT DOCUMENTS

| | | | | |
|---|---|---|---|---|
| 2010/0111370 A1* | 5/2010 | Black | ................ | G06K 9/00369 382/111 |
| 2011/0267358 A1* | 11/2011 | Rennuit | .................. | G06T 13/40 345/474 |
| 2012/0143358 A1* | 6/2012 | Adams | ................ | G06F 3/04815 700/92 |

(Continued)

OTHER PUBLICATIONS

Wang, M., Pose Selection for Animated Scenes and a Case Study of Bas-relief Generation, CGI '17, Jun. 27-30, 2017, Yokohama, Japan. . [online], [Retrieved on Aug. 31, 2020]. Retrieved from the Internet: <URL: https://core.ac.uk/download/pdf/193344041.pdf> (Year: 2017).*

(Continued)

*Primary Examiner* — Gordon G Liu
(74) *Attorney, Agent, or Firm* — Keller Jolley Preece

(57) ABSTRACT

The present disclosure relates to systems, methods, and non-transitory computer readable media for generating a digital animation of a digital animation character by utilizing a generative adversarial network and a hip motion prediction network. For example, the disclosed systems can utilize an unconditional generative adversarial network to generate a sequence of local poses of a digital animation character based on an input of a random code vector. The disclosed systems can also utilize a conditional generative adversarial network to generate a sequence of local poses based on an input of a set of keyframes. Based on the sequence of local poses, the disclosed systems can utilize a hip motion prediction network to generate a sequence of global poses based on hip velocities. In addition, the disclosed systems can generate an animation of a digital animation character based on the sequence of global poses.

20 Claims, 12 Drawing Sheets

(56) References Cited

U.S. PATENT DOCUMENTS

2020/0151559 A1* 5/2020 Karras .................... G06N 3/08

OTHER PUBLICATIONS

Holden, Daniel, Taku Komura, and Jun Saito. "Phase-functioned neural networks for character control." ACM Transactions on Graphics (TOG) 36, No. 4 (2017): 42.

Peng, Xue Bin, Pieter Abbeel, Sergey Levine, and Michiel van de Panne. "DeepMimic: Example-Guided Deep Reinforcement Learning of Physics-Based Character Skills." arXiv preprint arXiv:1804.02717 (2018).

Li, Zimo, Yi Zhou, Shuangjiu Xiao, Chong He, Zeng Huang, and Hao Li. "Auto-Conditioned Recurrent Networks for Extended Complex Human Motion Synthesis." arXiv preprint arXiv:1707.05363 (2017).

Kremer, Verena Elisabeth. "Quaternions and SLERP." Embots. dfki.de/doc/seminar_ca/Kremer_Quaternions.pdf (2008).

* cited by examiner

GENERATING REALISTIC ANIMATIONS FOR DIGITAL ANIMATION CHARACTERS UTILIZING A GENERATIVE ADVERSARIAL NETWORK AND A HIP MOTION PREDICTION NETWORK

BACKGROUND

Advancements in software and hardware platforms have led to a variety of improvements in computer systems that generate animations for digital models. For example, digital animation systems are now able to animate motion for digital avatars based on animators setting joint poses for individual frames of the animation. Additionally, some systems generate simple animations for avatars by using high-level parameters such as providing a path for generating a walking motion. Furthermore, some conventional systems interpolate rotations of joints between a set of dense keyframes, while other conventional systems utilize auto-conditioned recurrent neural networks to generate animations.

Despite these advances however, conventional digital animation systems continue to suffer from a number of disadvantages, particularly in their accuracy, efficiency, and flexibility. Indeed, many conventional systems inaccurately generate animations for digital models. For example, conventional systems that interpolate between joint rotations produce unrealistic digital images without a set of high-density key frames (e.g., a large number of key frames relative to the length of the digital animation). Similarly, systems that rely on animators to set joint poses often result in clumsy, disjointed animation sequences. Further, while some conventional systems can generate simplistic animations for locomotion or periodic motions, these systems are incapable of generating (or otherwise inaccurately generate) complex animation sequences for digital avatars (e.g., dance sequences or martial arts sequences).

In addition to shortcomings in accuracy, conventional digital animation systems are often inefficient. Indeed, as mentioned above, conventional systems that interpolate between frames require animators to generate large numbers of individual frames for an animation sequence which can be time-consuming and computationally expensive. Similarly, conventional systems that rely on animator manipulation of joints requires significant time and computing resources in iteratively providing different user interface representations of different animation versions and receiving user input to modify joint positions. Indeed, generating and processing large numbers of frames, particularly for an animation of a longer duration, can utilize an excessive amount of computing power and computing time.

As yet another disadvantage of conventional digital animation systems, many conventional systems are inflexible. For example, conventional systems that utilize auto-conditioned recurrent neural networks can synthesize motions, but do not allow for flexible user controls to adjust output motions. In addition, some conventional systems rigidly rely on instructions provided by animators (and/or are trained to mimic specific tasks) and therefore cannot flexibly adapt to generate creative, new animations with complex combinations of movements and/or animations with significant variation.

Thus, there are several disadvantages with regard to conventional digital animation systems.

SUMMARY

One or more embodiments described herein provide benefits and solve one or more of the foregoing or other problems in the art with systems, methods, and non-transitory computer readable media that generate realistic animation sequences for digital animation characters utilizing a generative adversarial network and a hip motion prediction network. For instance, the disclosed systems can generate extended and complex human motions such as dances or martial arts sequences. The disclosed systems can utilize various convolutional neural networks within a generative adversarial network and/or hip motion prediction network to synthesize a variety of realistic human motions while preserving particular styles of movement (e.g., salsa dances versus tango dances). In addition, the disclosed systems can simplify and improve efficiency relative to conventional animation systems by allowing animators to create a very small number of keyframes to control generation of long and complex animation sequences. For example, the disclosed systems can generate a 34-second dance sequence from only 8 keyframes, where a conventional animation system would require over 60 frames for the same length animation.

Additional features and advantages of the present application will be set forth in the following description.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
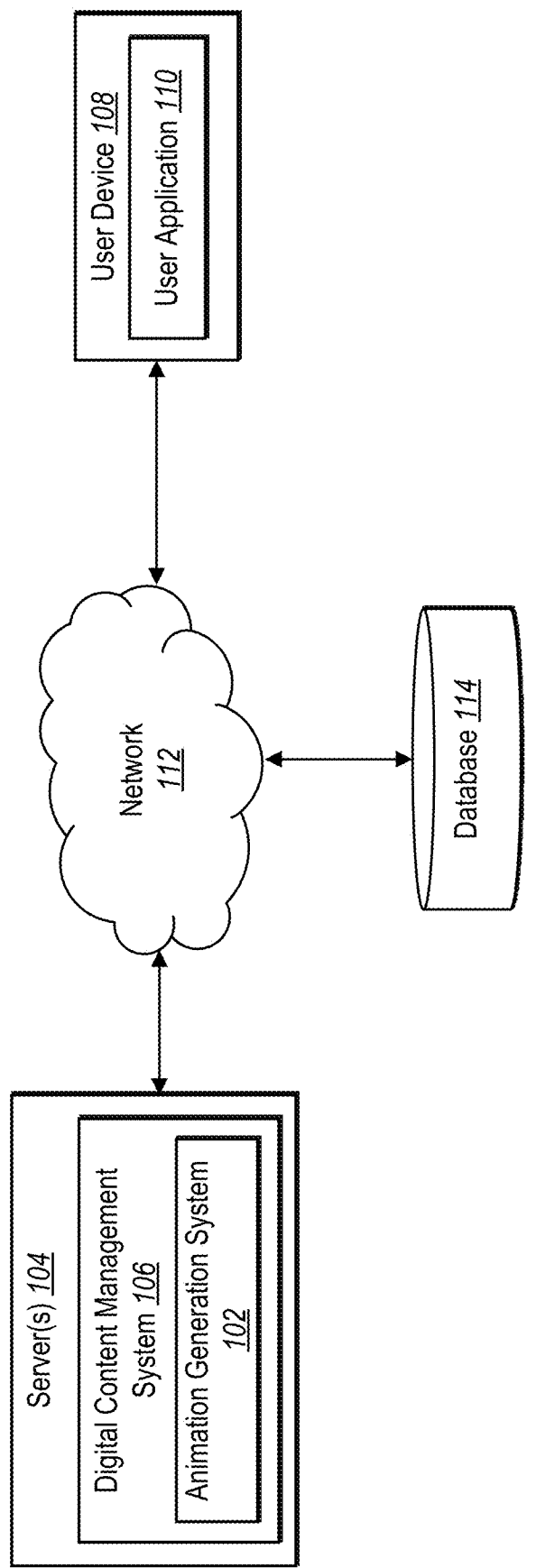
FIG. 1 illustrates an example environment for implementing an animation generation system in accordance with one or more embodiments.

One or more embodiments described herein provide benefits and solve one or more of the foregoing or other problems in the art with an animation generation system that generates an animation of a digital animation character utilizing a generative adversarial network and a hip motion prediction network. Particularly, the animation generation system can generate a sequence of frames for a long and complex animation of a digital animation character based on efficient, flexible inputs. For example, the animation generation system can generate random code vectors or utilize feature vectors generated from a sparse set of keyframes as input to a generative adversarial network. To generate an animation, the animation generation system can utilize the generative adversarial network to analyze the input and generate an arbitrary length sequence of local poses (e.g., joint positions relative to a root joint) of the digital animation character. Based on the sequence of local poses, the animation generation system can further utilize a hip motion prediction network to determine root joint velocities and generate a sequence of global poses. Thus, based on the global poses that indicate displacement of a root joint (e.g., a hip of the digital animation character) and local poses that indicate relative positions of other joints in relation to the root joint, the animation generation system can generate an animation of the digital animation character.

As mentioned, the animation generation system can identify an input for generating an animation of a digital animation character. In some embodiments, the animation generation system identifies an input in the form of a random code vector. By utilizing a random code vector, the animation generation system can generate complex, realistic movements without following a particular, pre-defined pattern. In addition, the animation generation system can also identify an input in the form of a set of keyframes. For example, the animation generation system can receive a set of keyframes that indicate specific poses for the digital animation character at particular frames during an animation sequence. The animation generation system can encode the keyframes as a code vector (e.g., a feature vector) and utilize the code vector to generate an animation. By utilizing a code vector reflecting sparse keyframes, the animation generation system can generate realistic complex movements that mirror the sparse keyframes provided by the user. Thus, by utilizing random code vectors (or different sparse keyframe inputs selected by the user) the animation generation system can flexibly generate a variety of realistic animations.

As mentioned above, the animation generation system can utilize a generative adversarial network to generate a sequence of local poses based on various inputs. For example, based on an input of a random code vector, the animation generation system can apply a generative adversarial network to generate a random sequence of local poses. In embodiments where the input is a set of keyframes, on the other hand, the animation generation system can utilize a generative adversarial network to generate a sequence of local poses where the local poses reflect joint positions of the digital animation character from corresponding frames of the set of keyframes.

Additionally, the animation generation system can utilize a hip motion prediction network to generate a sequence of global poses based on the sequence of local poses. Indeed, the animation generation system can utilize the output of the generative adversarial network—the sequence of local poses—as input for the hip motion prediction network. In embodiments where the input is a random code vector, the animation generation system can utilize the hip motion prediction network to determine motion (or velocity) of a root joint and generate a random sequence of global poses of the root joint (e.g., a hip joint). In embodiments where the input is a set of keyframes, on the other hand, the animation generation system can utilize the hip motion prediction network to generate a sequence of global poses where one or more of the global poses within the sequence align with keyframes within the set of keyframes. For example, the hip motion prediction network can output a sequence of global poses where the joints of the digital animation character within a given frame of the sequence of global poses aligns with joints of the digital animation character as depicted within a particular keyframe.

As mentioned, the animation generation system can generate an animation for the digital animation character. For example, the animation generation system can generate an animation of the digital animation character based on the sequence of global poses from the hip motion prediction network. Thus, the animation generation system can generate an animation that portrays realistic, complex motion of the digital animation character. For instance, the animation generation system can generate an animation of a dance sequence or a martial arts sequence. Additionally, in some embodiments, the animation generation system generates variations in animation sequences by applying noise vectors to the input of the generative adversarial network.

Animators can utilize the animation generation system to generate character animations in a variety of applications. For example, animators can utilize the animation generation system to generate animations for movie productions or video games. In some cases, animators can apply the animation generation system to animate a digital animation character to have unpredictable but realistic motion in an interactive video game. Some animators can also (or alternatively) apply the animation generation system to animate a digital animation character to have a particular appearance to match actions in a scene for a movie.

In addition to applying a generative adversarial network and/or hip motion prediction network, the animation generation system can also train a generative adversarial network and/or hip motion prediction network. Indeed, in some embodiments, the animation generation system trains the generative adversarial network by utilizing a generator to create animation sequences. The animation generation system then utilizes a discriminator to distinguish between the created animation sequences and a repository of training animation sequences. The animation generation system can iteratively train the generator of the generative adversarial network to create realistic animation sequences that are realistic (e.g., indistinguishable) relative to the repository of training images.

Similarly, in one or more embodiments, the animation generation system trains the hip motion prediction network. In particular, the animation generation system can train the hip motion prediction network by generating sequences of global poses using the hip motion prediction network and comparing the predicted global poses with ground truth animation sequences. In some embodiments, the animation generation system utilizes multiple loss functions to compare predicted global poses and ground truth animation sequences across different frame intervals. For example, the animation generation system can determine losses by comparing predicted global poses and ground truth animation sequences across a first frame and a fourth frame, a first frame and an eighth frame, or a first frame and a sixteenth frame. By analyzing losses across different frame intervals, the animation generation system can reduce accumulative error between frames.

The animation generation system provides several advantages over conventional digital animation systems. For example, the animation generation system improves accuracy relative to these conventional systems. More specifically, by utilizing a generative adversarial network and/or a hip motion prediction network, the animation generation system can generate accurate, realistic animation sequences. In particular, the animation generation system can implement a two-step motion generation framework that utilizes a generative adversarial network to determine accurate local poses and a hip motion prediction network that generates global motion of the hip from of each frame from arbitrary length of local motion sequences. In this manner, the animation generation system can generate realistic, complex animation sequences with a sparse set of keyframes and/or with no keyframes at all (e.g., with a random code vector).

In addition, the animation generation system improves efficiency over conventional systems. For example, the animation generation system can generate arbitrary length animations with a sparse (reduced) set of keyframes relative to conventional systems, and thus reduce computation time and computation power for generating animations. Indeed, the animation generation system can avoid computational resources needed by conventional systems to generate and analyze a dense set of keyframes. Similarly, by automatically generating a sequence of digital images, the animation generation system can reduce time and processing power devoted to excessive user interactions and user interface manipulation associated with conventional systems that rely on animator joint manipulation.

As a further advantage, the animation generation system improves flexibility over conventional digital animation systems. Particularly, the animation generation system can flexibly adapt to different input types for generating animation sequences. For example, where conventional systems require specific frames from animators to generate animations, the animation generation system can generate animation sequences based on different input types as well as on user controls to adjust output motions. Additionally, the animation generation system can adaptively generate animations that have variations based on noise vectors (or different sparse keyframes), as opposed to conventional systems that rigidly generate animations based on specific instructions. Indeed, while many conventional systems require specific instructions for generating simple animations, the animation generation system described herein utilizes predictive machine learning techniques to flexibly generate more complex animations with far less input or instruction. In addition, the animation generation system can be utilized to generate animations in different types of applications such as planning a reasonable path of motion from one given pose to another given pose or predicting motions of characters in a single-view video taken by a moving camera.

As illustrated by the foregoing discussion, the present disclosure utilizes a variety of terms to describe features and benefits of the animation generation system. Additional detail is hereafter provided regarding the meaning of these terms as used in this disclosure. In particular, the term "animation" refers to a sequence or series of digital images or frames that depict motion (e.g., motion of a digital animation character). Indeed, an animation can include a sequence of frames where consecutive frames include depictions of a digital animation character in different positions. Thus, the displacement of various joints of the digital animation character between frames gives the impression of movement when the frames of the animation are viewed in rapid succession.

Relatedly, the term "digital animation character" refers to a digital model with a plurality of joints. In particular, a digital animation character includes a model of a human, animal, or character that includes modifiable joints (that can be moved or positioned relative to a root joint) connected by structural members. A digital animation character can include a three-dimensional digital model in the approximate shape of a human with appendages resembling human bone structures such as arms, legs, and other features connected by joints. In some embodiments, the digital animation character can include a different shape (e.g., an animal or a fantasy creature) for use in digital animation.

Additionally, a root joint can include a reference joint in a digital animation character. A root joint can include a hip joint with a "hip position" (or some other joint, such as a shoulder joint) that defines a root position or relative positions for other joints of the digital animation character. For example, a hip position can include a three-dimensional coordinate location of a hip joint of a digital animation character. Further, a "joint position" refers to a position of a joint. In particular, a joint position can include a global position (a position within a global reference frame or coordinate system) or a local position relative to a root joint position in three-dimensional space. Indeed, a joint position can include a three-dimensional coordinate location of a joint relative to a hip joint.

As mentioned, the animation generation system can generate an animation of a digital animation character by utilizing a generative adversarial network. As used herein, the term "generative adversarial network" (or simply "GAN") refers to a machine learning model trained by contesting machine learning models (e.g., a generator and a discriminator). In some embodiments, a generative adversarial network can include one or more neural networks. For example, during training, a generative adversarial network can include two convolutional neural networks in competition with one another, a generator neural network and one or more discriminator neural networks. The generator neural network can generate predictions to try and fool the discriminator neural network(s), and the discriminator neural network(s) can attempt to distinguish generated predictions from actual data (e.g., from a repository). For example, based on an input, a generator neural network can generate a sequence of frames which are provided to the discriminator neural network(s). In turn, the discriminator neural network(s) can compare the generated sequence of frames with an actual sequence of frames from a database or repository to select which sequence is real (from the database).

As used herein, the term "local pose" refers to one or more positions of one or more joints and/or structural members relative to a root position (e.g., relative to a root joint position). For example, a local pose can include a three-dimensional coordinate of one or more joints in relation to a three-dimensional coordinate of a hip joint. Indeed, the animation generation system can utilize a generative adversarial network to generate a sequence of local poses based on various code vectors (e.g., random code vectors or code vectors generated from a sets of keyframes).

As used herein, the term "code vector" refers to a mathematical representation utilized to generate an animation. For example, a code vector can include a random code vector. As used herein a "random code vector" refers to a random (or pseudo-random) mathematical representation. In particular, a random code vector include a sequence of numbers generated by a non-deterministic algorithm (e.g., random vector generator) that is utilized to generate an animation. In addition to a random code vector a code vector can also include one or more feature vectors generated from keyframes. For example, the animation generation system can utilize an encoder to generate a code vector reflecting features of keyframes.

In addition, the term "keyframe" refers to a frame or a digital image portraying a digital animation character. In particular, a keyframe includes a frame that portrays a digital animation character in a pose at a particular instance within an animation. For example, a set of keyframes can indicate various positions (or poses) for a digital animation character in particular frames throughout an animation. Thus, a final generated animation can include frames that align with the keyframes such that the position of the digital animation character within those select frames match the position of the digital animation character within the corresponding keyframes.

As also mentioned, the animation generation system can generate an animation of a digital animation character further utilizing a hip motion prediction network. As used herein, the term "hip motion prediction network" refers to a neural network that generates, determines, or predicts motions of a root joint and/or corresponding global poses of a digital animation character. In particular, a hip motion prediction network can include a convolutional neural network that generate predictions of motion (e.g., velocities) of a hip joint between frames. A hip motion prediction network can also predict global poses (e.g., based on the predicted motions/velocities between frames). A "global pose" refers to a position of one or more joints within a global reference frame or coordinate system). For example, a global pose can include a position of a hip joint of a digital animation character (e.g., a three-dimensional coordinate of a hip joint of a digital animation character for a particular frame). As mentioned, in some embodiments, a global pose can reflect (e.g., is based on) a velocity of the hip joint as indicated by a displacement of the hip joint between frames (e.g., consecutive frames). Accordingly, use of the term "global pose" herein can include a hip motion or hip velocity.

Additionally, the term "sequence" (e.g., a sequence of local poses or a sequence of global poses) can refer to a plurality of frames arranged in a chronological order. For example, a sequence can include a sequence or series of frames that depict local and/or global poses of a digital animation character at different times or frames through the sequence.

As mentioned, the hip motion prediction network and/or the generative adversarial network can include one or more neural networks. As used herein, the term "neural network" (such as a generator neural network, a discriminator neural network, or an encoder neural network) refers to a computer-based algorithm that can be tuned (e.g., trained) based on inputs to approximate unknown functions. For example, a neural network includes a machine learning model such as a deep neural network that utilizes interconnected artificial neurons (or layers) that communicate and learn to approximate complex functions and generate outputs based on a plurality of inputs provided to the model. In some embodiments, a neural network can employ supervised learning, while in other embodiments a neural network can employ unsupervised learning or reinforced learning. In the same or other embodiments, a neural network can be a convolutional neural network a fully connected convolutional neural network and/or a deep neural network Additionally, the term "train" (or its variations such as "training") refers to utilizing information to tune or teach a model (e.g., by adjusting one or more weights of a neural network) such as the generative adversarial network or the hip motion prediction network. The term "training" (used as an adjective or descriptor, such as "training data" or "training features") refers to information or data utilized to tune or teach the model. In some embodiments, the animation generation system trains one or more models to generate accurate predictions based on training data.

Additional detail regarding the animation generation system will now be provided with reference to the figures. For example, FIG. 1 illustrates a schematic diagram of an example environment for implementing an animation generation system 102 in accordance with one or more embodiments. An overview of the animation generation system 102 is described in relation to FIG. 1. Thereafter, a more detailed description of the components and processes of the animation generation system 102 is provided in relation to the subsequent figures.

As shown in FIG. 1, the environment includes server(s) 104, a user device 108, a database 114, and a network 112. Each of the components of the environment can communicate via the network 112, and the network 112 may be any suitable network over which computing devices can communicate. Example networks are discussed in more detail below in relation to FIG. 12.

As mentioned, the environment includes a user device 108. The user device 108 can be one of a variety of computing devices, including a smartphone, a tablet, a smart a television, a desktop computer, a laptop computer, a virtual reality device, an augmented reality device, or some other computing device as described in relation to FIG. 12. The user device 108 can receive user input from a user in the form of clicks, keyboard inputs, touchscreen inputs, etc. In some embodiments, the user device 108 facilitates generation of digital animations.

In particular, the user device 108 includes a user application 110 whereby a user can generate a digital animation of a digital animation character. The user application 110 may be a web application, a native application installed on the user device 108 (e.g., a mobile application, a desktop application, etc.), or a cloud-based application where all or part of the functionality is performed by the server(s) 104. The user application 110 can present or display information to a user such as an animation generation interface including selectable options for generating and/or modifying animations of digital animation characters. Thus, users can interact with the user application 110 to provide user input to, for example, generate an animation or apply a noise vector to modify an animation.

As further shown, the environment includes the database 114. In particular, the server(s) 104 and the user device 108 can communicate with the database 114 via the network 112. For example, the user device 108 and/or the server(s) 104 can communicate with the database 114 to access information stored within the database 114 such as training data (e.g., training sequences of local poses or ground truth sequences of global poses) or input data such as random code vectors or sets of keyframes.

As illustrated in FIG. 1, the environment includes the server(s) 104. The server(s) 104 may generate, store, process, receive, and transmit electronic data, such as random code vectors, sets of keyframes, or animations. For example, the server(s) 104 can transmit data to the user device 108 to provide an animation for display via the user application 110. The server(s) 104 may identify (e.g., monitor and/or receive) data from the user device 108 in the form of an input to generate or modify an animation. In some embodiments, the server(s) 104 comprises a digital content server. The server(s) 104 can also comprise an application server, a communication server, a web-hosting server, a social networking server, a digital content campaign server, or a digital communication management server.

As shown in FIG. 1, the server(s) 104 can also include the animation generation system 102 (e.g., implemented as part of a digital content management system 106). Although FIG. 1 depicts the animation generation system 102 located on the server(s) 104, in some embodiments, the animation generation system 102 may be implemented by (e.g., located entirely or in part) on one or more other components of the environment. For example, the animation generation system 102 may be implemented by the user device 108, and/or a third-party device.

In some embodiments, though not illustrated in FIG. 1, the environment may have a different arrangement of components and/or may have a different number or set of components altogether. For example, the database 114 and/or the user device 108 may communicate directly with the animation generation system 102, bypassing the network 112. Indeed, in one or more embodiments, the database 114 may be located on the server(s) 104. Additionally, the animation generation system 102 can include one or more additional databases housed on the server(s) 104 or elsewhere in the environment.

Figure 2:
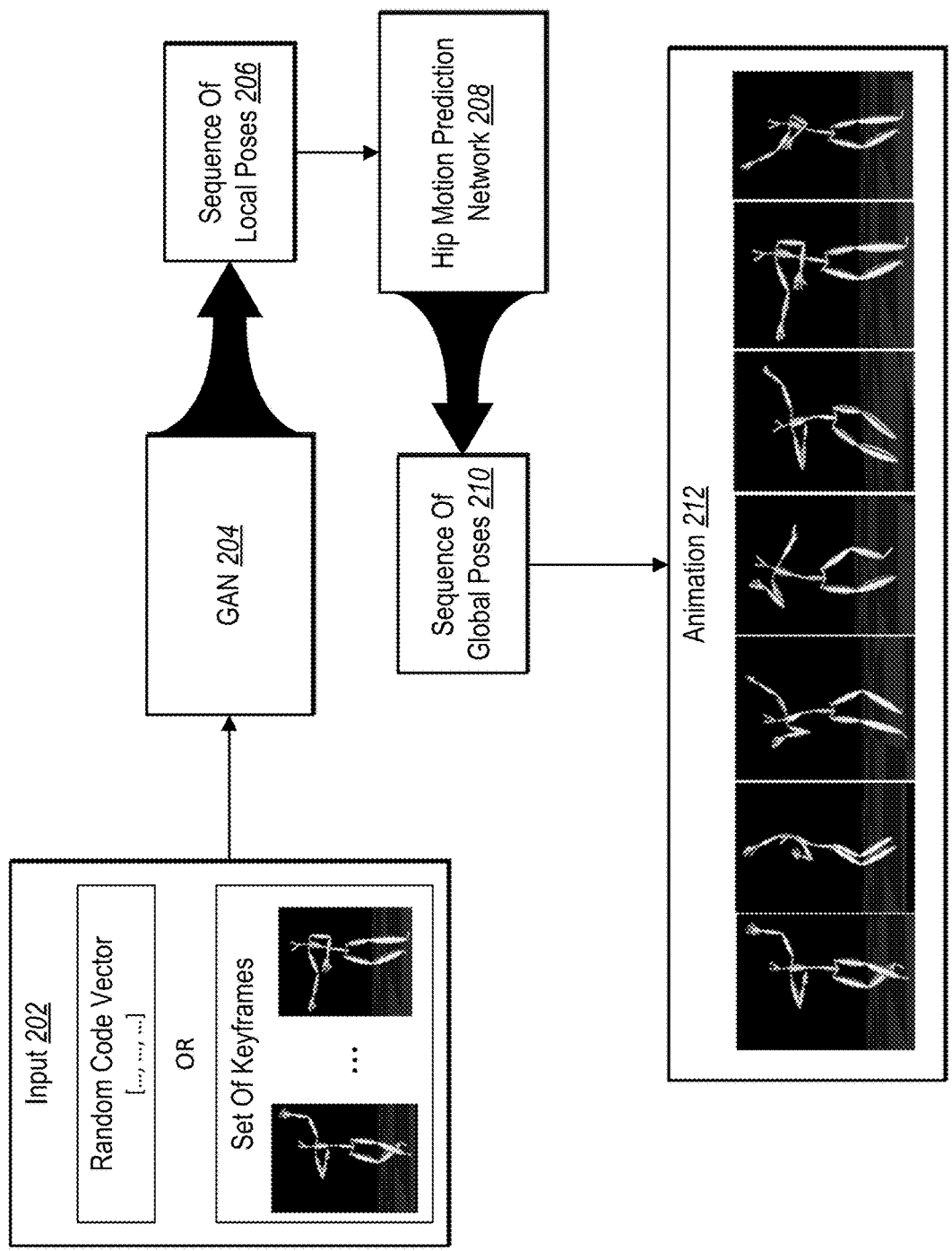
FIG. 2 illustrates an overview of generating an animation by utilizing a generative adversarial network and a hip motion prediction network in accordance with one or more embodiments.

As mentioned, the animation generation system 102 can generate an animation of a digital animation character. FIG. 2 illustrates generating an animation 212 based on an input 202 in accordance with one or more embodiments. Based on the process illustrated in FIG. 2, the animation generation system 102 can generate animations that include complex motion sequences such as martial arts sequences or dance sequences (or other complicated movements). For example, the animation generation system 102 can receive a user input (e.g., via the user application 110) to select a particular style of animation (e.g., from among a number of animation styles that the GAN 204 and the hip motion prediction network 208 are trained to recognize).

As illustrated in FIG. 2, the animation generation system 102 identifies an input 202. In some embodiments, the animation generation system 102 accesses or receives the input 202 from the user device 108, the server(s) 104, or from the database 114. For example, the animation generation system 102 identifies the input 202 in the form of a random code vector or a set of keyframes. In embodiments where the input 202 is a random code vector, the animation generation system 102 identifies the random code vector including a particular number of dimensions or codes (e.g., 128 dimensions or 128 arandom codes).

In embodiments where the input 202 is a set of keyframes, the animation generation system 102 identifies the set of keyframes including a particular number of keyframes that define global poses and/or local poses for a digital animation character. Particularly, the animation generation system 102 identifies a set of keyframes with values of three-dimensional poses at given frames (and zeros for blank frames). As an example, the animation generation system 102 identifies a 512-frame set or sequence of keyframes with three-dimensional values for a $1^{st}$, $128^{th}$, $256^{th}$, and $384^{th}$ keyframes and blank frames for the rest of the set. Indeed, in some embodiments, the animation generation system 102 ultimately generates the animation 212 having, for example, a 34 second duration by setting only 8 keyframes.

As illustrated in FIG. 2, the animation generation system 102 utilizes the GAN 204 to analyze the input 202. In particular, the animation generation system 102 utilizes the GAN 204 to analyze the input 202 to generate a sequence of local poses 206. In embodiments where the input 202 is a random code vector of 128 random codes, for example, the GAN 204 generates the sequence of local poses 206 including 1024 frames (around 20 to 40 seconds) of three-dimensional joint positions on the digital animation character within a temporal sequence. In embodiments where the input 202 is a set of keyframes (e.g., a 512-keyframe sequence), the GAN 204 generates the sequence of local poses 206 to include frames that depict joint positions of a digital animation character that align with the joint positions of the digital animation character with the set of keyframes. Additional detail regarding the GAN 204 and its architecture is provided below with reference to FIGS. 3-4 and FIG. 6.

As further illustrated, the animation generation system 102 utilizes a hip motion prediction network 208 to generate a sequence of global poses 210 based on the sequence of local poses 206. In particular, the hip motion prediction network 208 takes the sequence of local poses 206 in the form of three-dimensional joint positions (e.g., having arbitrary lengths) and generates root joint (e.g., hip) velocities for each frame of the sequence of global poses 210. In addition, the animation generation system 102 determines the sequence of global poses 210 based on the hip velocities and a given start position of the digital animation character. Additional detail regarding the hip motion prediction network 208 and its architecture is provided below with reference to FIG. 5.

As shown in FIG. 2, the animation generation system 102 generates the animation 212 based on the sequence of global poses 210. To generate the animation 212, the animation generation system 102 utilizes the sequence of global poses 210 to generate a sequence of frames that reflect the digital animation character with the generated sequence of global poses 210. Thus, in embodiments where the input 202 is a random code vector, the animation generation system 102 generates the animation 212 in the form of a random animation. In embodiments where the input 202 is a set of keyframes, on the other hand, the animation generation system 102 generates the animation 212 to include frames that align with the keyframes within the set of keyframes such that particular frames of the animation 212 reflect the digital animation character having global and/or local poses shown within the keyframes of the set of keyframes at corresponding times.

Figure 3:
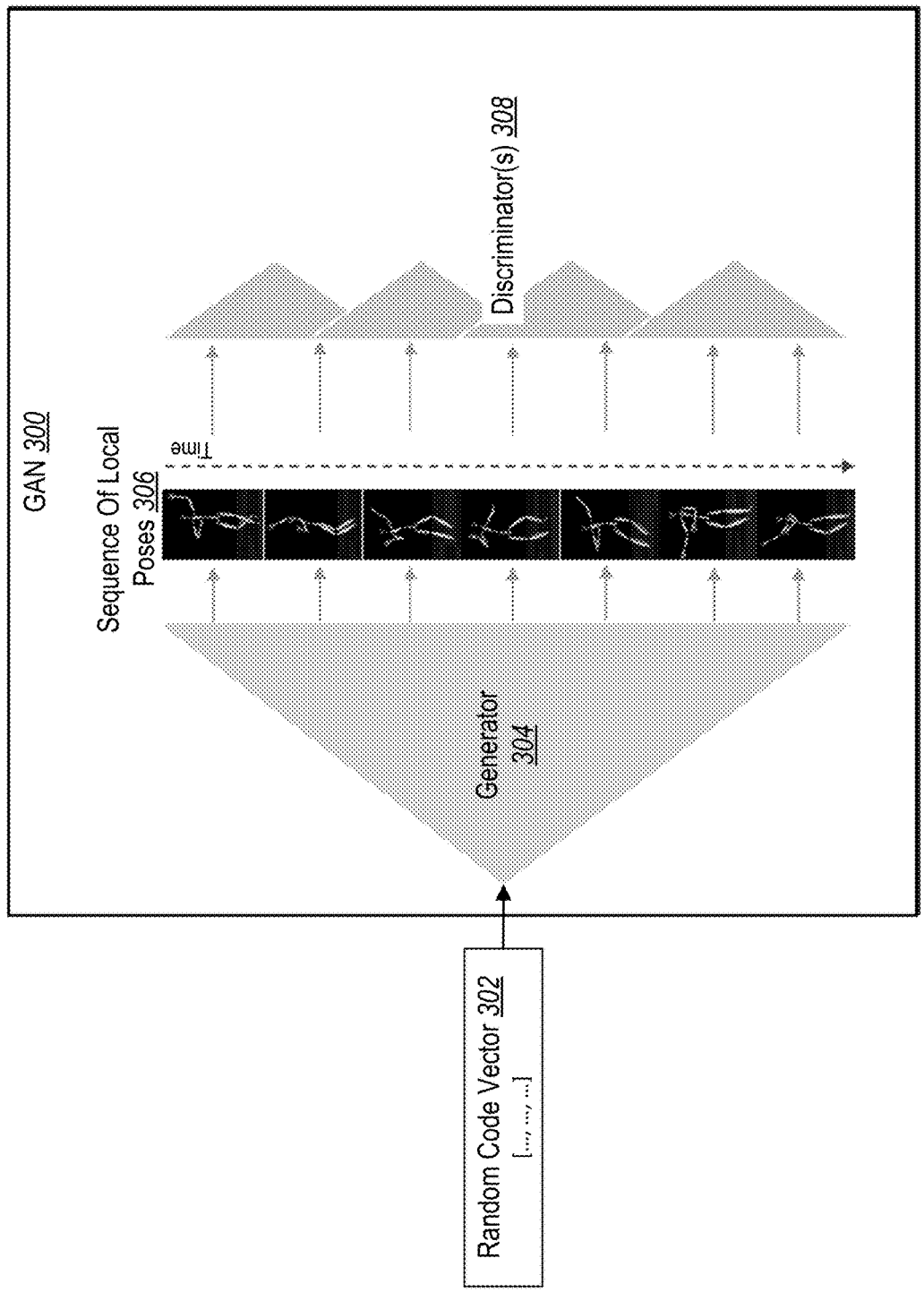
FIG. 3 illustrates an unconditional generative adversarial network in accordance with one or more embodiments.

As mentioned, the animation generation system 102 can utilize the GAN 204 to generate the sequence of local poses 206 based on the input 202. FIG. 3 illustrates an example embodiment of a GAN 300 (e.g., the GAN 204) in cases where the input 202 is a random code vector 302. As shown, the GAN 300 is an unconditional GAN that takes an input of a random code vector 302 and generates a sequence of local poses 306 (e.g., the sequence of local poses 206). In some embodiments, the animation generation system 102 utilizes the GAN 300 to generate local poses in the form of one-dimensional vectors. For example, the animation generation system 102 generates a sequence of joint positions for each of a particular number (e.g., 19 or 57) of joints, where each joint position includes three values, one for each dimension in a three-dimensional coordinate location (x-axis value, y-axis value, and z-axis value).

To generate the sequence of local poses 306, the GAN 300 includes a generator neural network 304. In particular, the generator neural network 304 is a one-dimensional fully convolutional neural network that determines convolution along a temporal axis. The input into the generator neural network 304 is the random code vector 302 having a particular number (e.g., 128) of random codes. Based on the internal layers, neurons, and parameters of the generator neural network 304, the generator neural network 304 outputs the sequence of local poses 306. Indeed, the generator neural network 304 generates a sequence (e.g., 1024 frames based on an input of 128 random codes) of three-dimensional joint positions of the digital animation character.

As shown, the GAN 300 also includes one or more discriminator neural networks 308. In particular, when training the GAN 300, the animation generation system 102 utilizes the discriminator neural networks 308. Upon testing or implementation, however, the GAN 300 need not utilize the discriminator neural networks 308. Indeed, in some embodiments, the GAN 300 includes multiple discriminator neural networks 308 (that share the same weights) to determine whether one or more sub-sequences of a whole sequence are realistic or not. To elaborate, during training, the animation generation system 102 utilizes the discriminator neural networks 308 to determine predicted training sequences of local poses by selecting between the predicted sequences of local poses (e.g., the sequence of local poses 306) from the generator neural network 304 and training sequences of local poses from a repository of training animation sequences (e.g., the database 114). Additional detail regarding training the GAN 300 is provided below with reference to FIG. 7.

Figure 4:
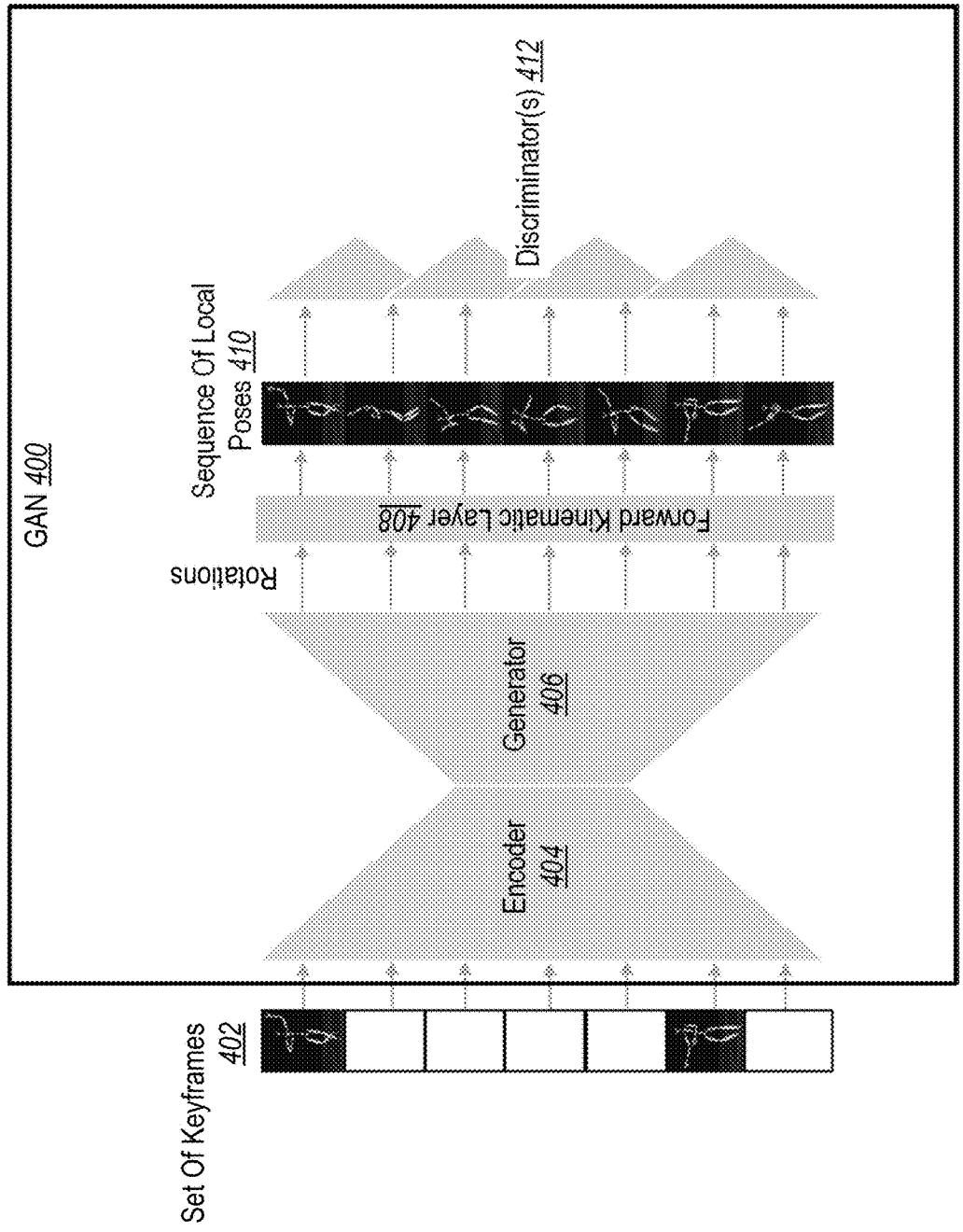
FIG. 4 illustrates a conditional generative adversarial network in accordance with one or more embodiments.

As mentioned, the GAN 204 can have a different architecture in embodiments where the input 202 is a set of keyframes than in embodiments where the input 202 is a random code vector. FIG. 4 illustrates an example architecture of a GAN 400 (e.g., the GAN 204) in embodiments where the input is a set of keyframes 402. Indeed, the set of keyframes 402 illustrates example keyframes of global and/or local poses of a digital animation character as well as blank frames without required global and/or local poses for the digital animation character. As shown, the GAN 400 is a conditional GAN that includes an encoder neural network 404, a generator neural network 406, a forward kinematic layer 408, and one or more discriminator neural networks 412. The animation generation system 102 utilizes the GAN 400 to generate a sequence of joint positions for each of a particular number (e.g., 19 or 57) of joints in a one-dimensional vector, where each joint position includes three values, one for each dimension in a three-dimensional coordinate location. Indeed, in some embodiments, the GAN 400 generates an arbitrary length of local poses conditioned on a sparse set of input keyframes of poses.

The animation generation system 102 inputs the set of keyframes 402 into the GAN 400, whereupon the encoder neural network 404 (a fully convolutional neural network) encodes the set of keyframes 402 into a code vector—i.e., a vector representation of the set of keyframes 402. In addition, the generator neural network 406 analyzes the code vector. For instance, the generator neural network 406 is a one-dimensional fully convolutional neural network that takes the code vector to generate the sequence of local poses 410 (e.g., the sequence of local poses 206). In some embodiments, the generator neural network 406 does not generate the sequence of local poses 410 directly, but generates three-dimensional joint rotations of each joint of the digital animation character as quaternions instead.

Based on the quaternions generated by the generator neural network 406, the animation generation system 102 utilizes a forward kinematic layer 408 (as part of the GAN 400) to obtain or determine a joint position of each joint of the digital animation character based on the corresponding joint rotations. For example, for a given joint, the animation generation system 102 transfers the quaternions to a local Euler rotation where the Z-axis points in the direction of an anchor (e.g., a bone) of the corresponding joint. In some embodiments, the animation generation system 102 further determines and reduces an error associated with each joint to determine joint positions. In this manner, the animation generation system 102 utilizes the forward kinematic layer 408 of the GAN 400 to generate the sequence of local poses 410. Although not illustrated in FIG. 3, the animation generation system 102 can also utilize a forward kinematic layer in the GAN 300.

As shown in FIG. 4, the GAN 400 also includes one or more discriminator neural networks 412. As described above in relation to FIG. 3, when training the GAN 400, the animation generation system 102 utilizes the discriminator neural networks 412. Upon testing or implementation, however, the GAN 400 need not include the discriminator neural networks 412. Indeed, in some embodiments, the GAN 400 includes multiple discriminator neural networks 412 (that share the same weights) to determine whether one or more sub-sequences of a whole sequence are realistic or not. For training, the animation generation system 102 utilizes the discriminator neural networks 412 to determine predicted training sequences of local poses by selecting between the predicted sequences of local poses (e.g., the sequence of local poses 410) from the generator neural network 406 and training sequences of local poses from a repository of training animation sequences (e.g., the database 114). Additional detail regarding training the GAN 400 is provided below with reference to FIG. 8.

Figure 5:
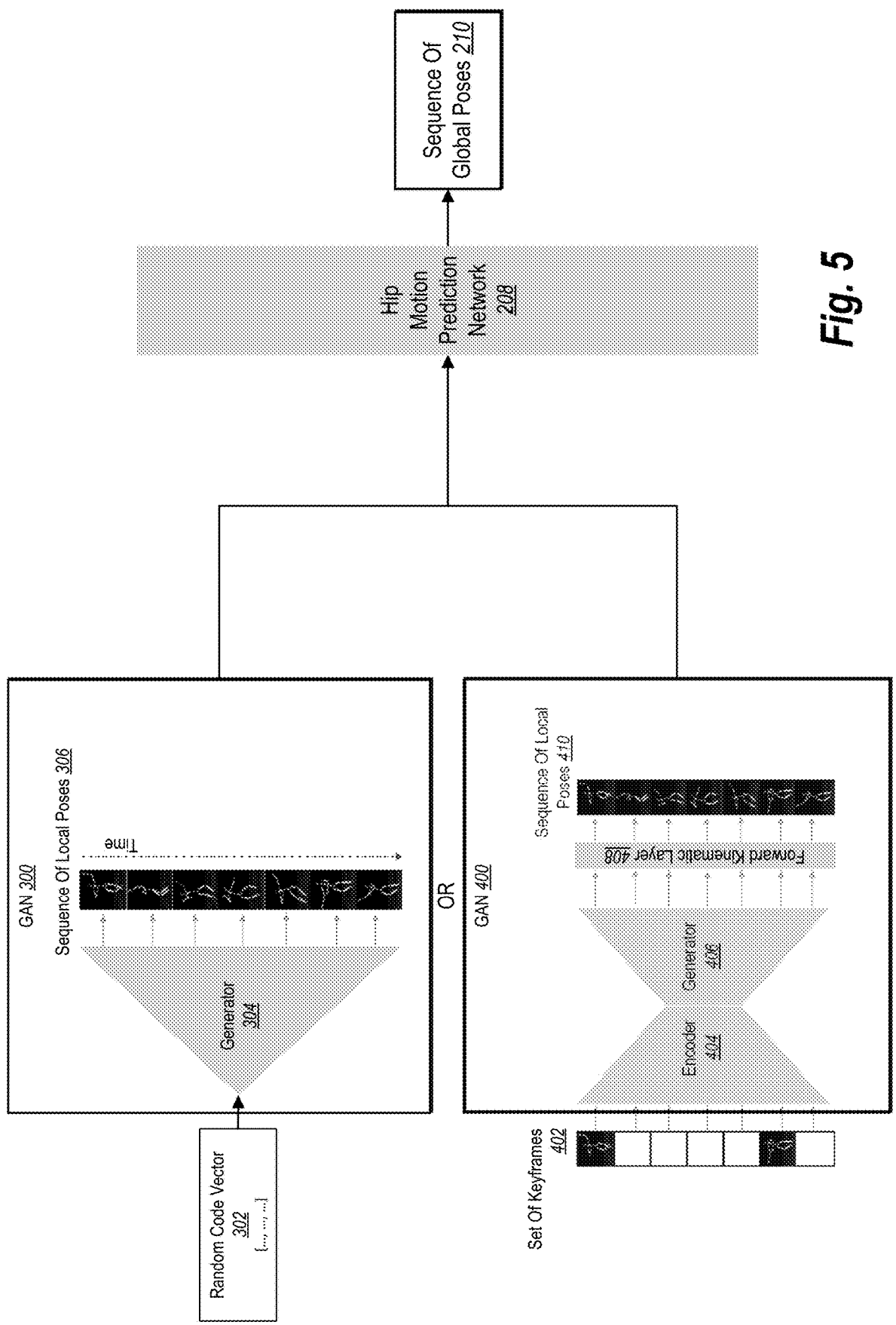
FIG. 5 illustrates utilizing a hip motion prediction network to generate a sequence of global poses in accordance with one or more embodiments.

As mentioned above, the animation generation system 102 can utilize a hip motion prediction network to generate a sequence of global poses based on a sequence of local poses. Indeed, the animation generation system 102 can generate the sequence of global poses 210 by utilizing the GAN 300 or the GAN 400 and the hip motion prediction network 208. FIG. 5 illustrates utilizing a hip motion prediction network to generate global poses in accordance with one or more embodiments. As shown in FIG. 5, the animation generation system 102 can utilize the GAN 300 or the GAN 400. For example, the animation generation system 102 can utilize the GAN 300 in circumstances where the input 202 is a random code vector 302 and utilize the GAN 400 in circumstances where the input 202 is a set of keyframes 402. As shown in FIG. 5, in either case, the animation generation system 102 utilizes the hip motion prediction network 208 to generate the sequence of global poses 210.

As illustrated in FIG. 5, the animation generation system 102 inputs a sequence of local poses (e.g., the sequence of local poses 306 or 410) into the hip motion prediction network 208. The hip motion prediction network 208 is a fully convolutional neural network that takes arbitrary length three-dimensional joint positions (i.e., a sequence of local poses) and generates hip velocities for each frame of the sequence of local poses. In addition, the animation generation system 102 generates the sequence of global poses 210 by determining hip positions for each frame of the sequence by integrating based on the determined hip velocities and a given initial position of the digital animation character (i.e., to determine an actual path of the digital animation character over time). In this manner, the hip motion prediction network 208 generates the sequence of global poses 210 based on the sequence of local poses 306 or 410. Indeed, the animation generation system 102 trains the hip motion prediction network 208 to generate accurate sequences of hip velocities (or sequences of global poses).

Figure 9:
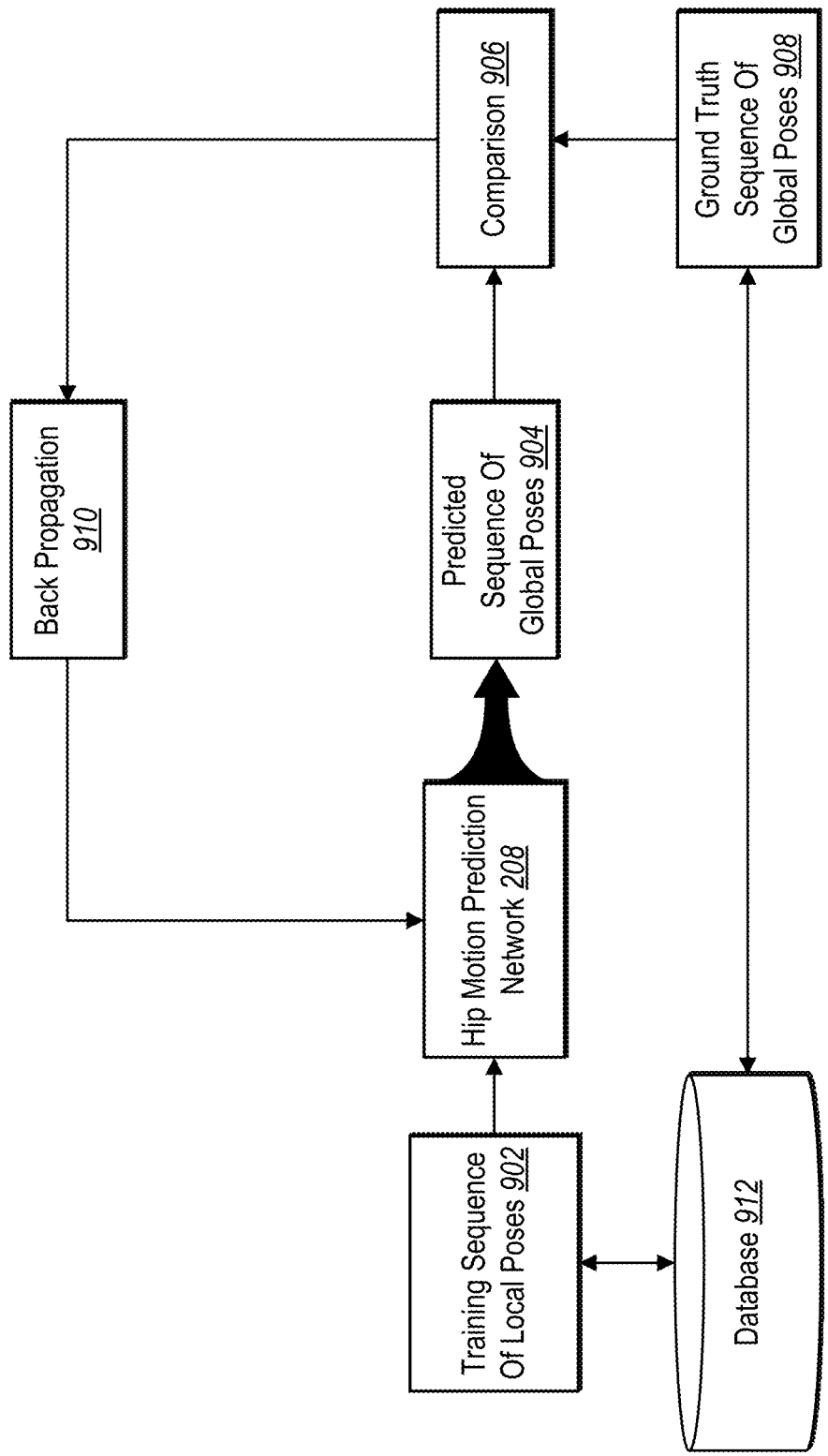
FIG. 9 illustrates a method of training a hip motion prediction network in accordance with one or more embodiments.

Additional detail regarding training the hip motion prediction network 208 is provided below with reference to FIG. 9.

Figure 6:
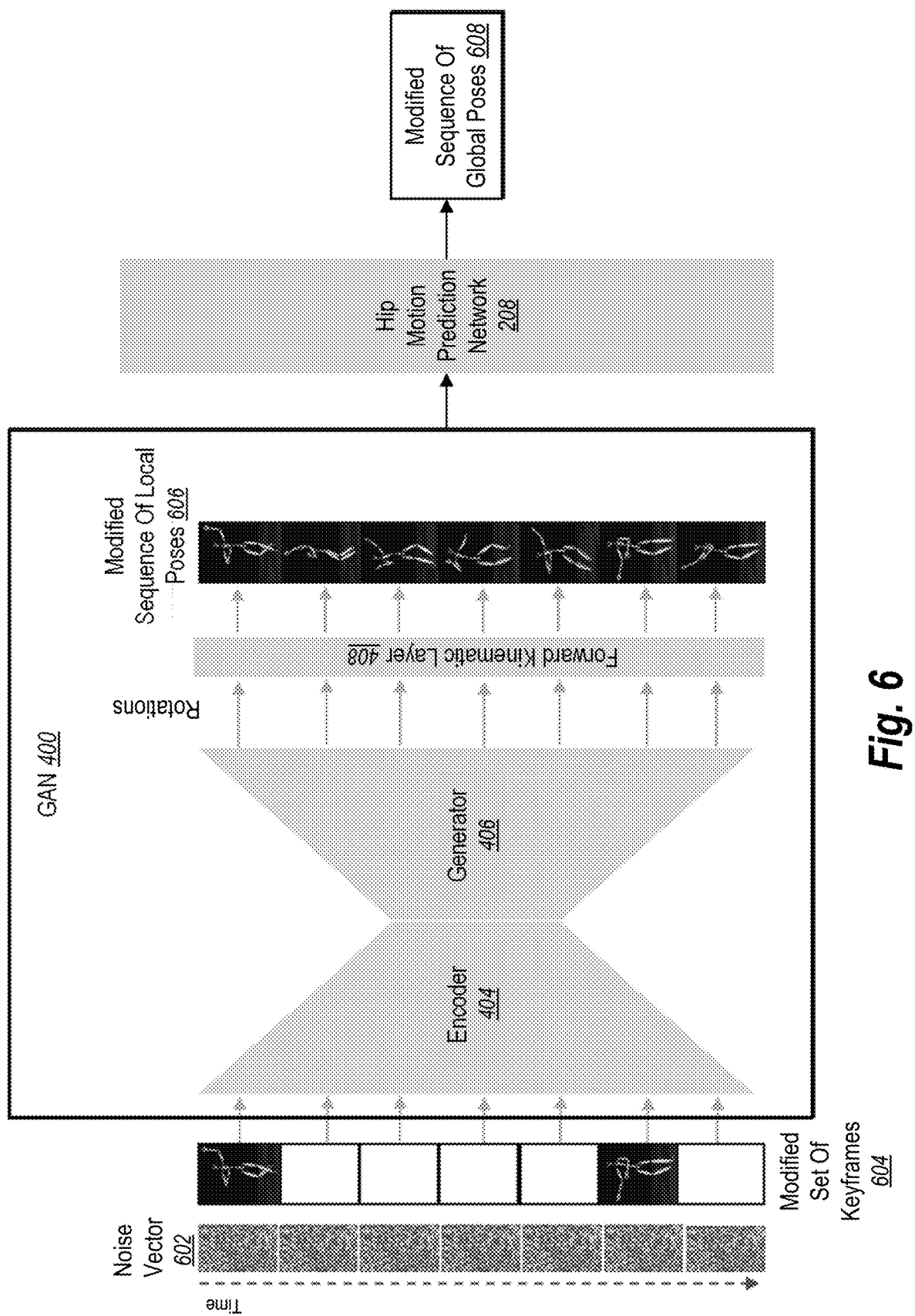
FIG. 6 illustrates generating a modified sequence of global poses based on applying a noise vector in accordance with one or more embodiments.

As mentioned, the animation generation system 102 can generate varied animations of a digital animation character by utilizing a noise vector. In particular, the animation generation system 102 generates modified animations that have different global poses and/or local poses for different frames by applying a noise vector. Indeed, FIG. 6 illustrates application of a noise vector 602 to the set of keyframes 402 in accordance with one or more embodiments. By applying the noise vector 602, the animation generation system 102 modifies the set of keyframes 402 and inputs the modified set of keyframes 604 into the GAN 400. Thus, by utilizing different noise vectors (or by modifying the noise vector 602), the animation generation system 102 generates different modified animations with variations in global poses and/or local poses.

Specifically, the encoder neural network 404 encodes the modified set of keyframes 402 into a modified code vector, which the generator neural network 406 analyzes to generate a modified sequence of three-dimensional rotations of joints represented as quaternions. In addition, the forward kinematic layer 408 determines a modified sequence of local poses 606 including joint positions of the joints of the digital animation character based on the modified rotations. As further shown in FIG. 6, the animation generation system 102 utilizes the hip motion prediction network 208 to generate a modified sequence of global poses 608 based on the modified sequence of local poses 606. For example, the hip motion prediction network 208 generates a modified sequence of hip velocities, and the animation generation system 102 determines a modified path of the digital animation character based on the modified hip velocities and an initial position. Thus, based on the modified sequence of global poses 210, the animation generation system 102 generates a modified animation of the digital animation character reflecting the modified sequence of global poses. In this way, the animation generation system 102 utilizes the noise vector 602 to generate the modified animation.

Figure 7:
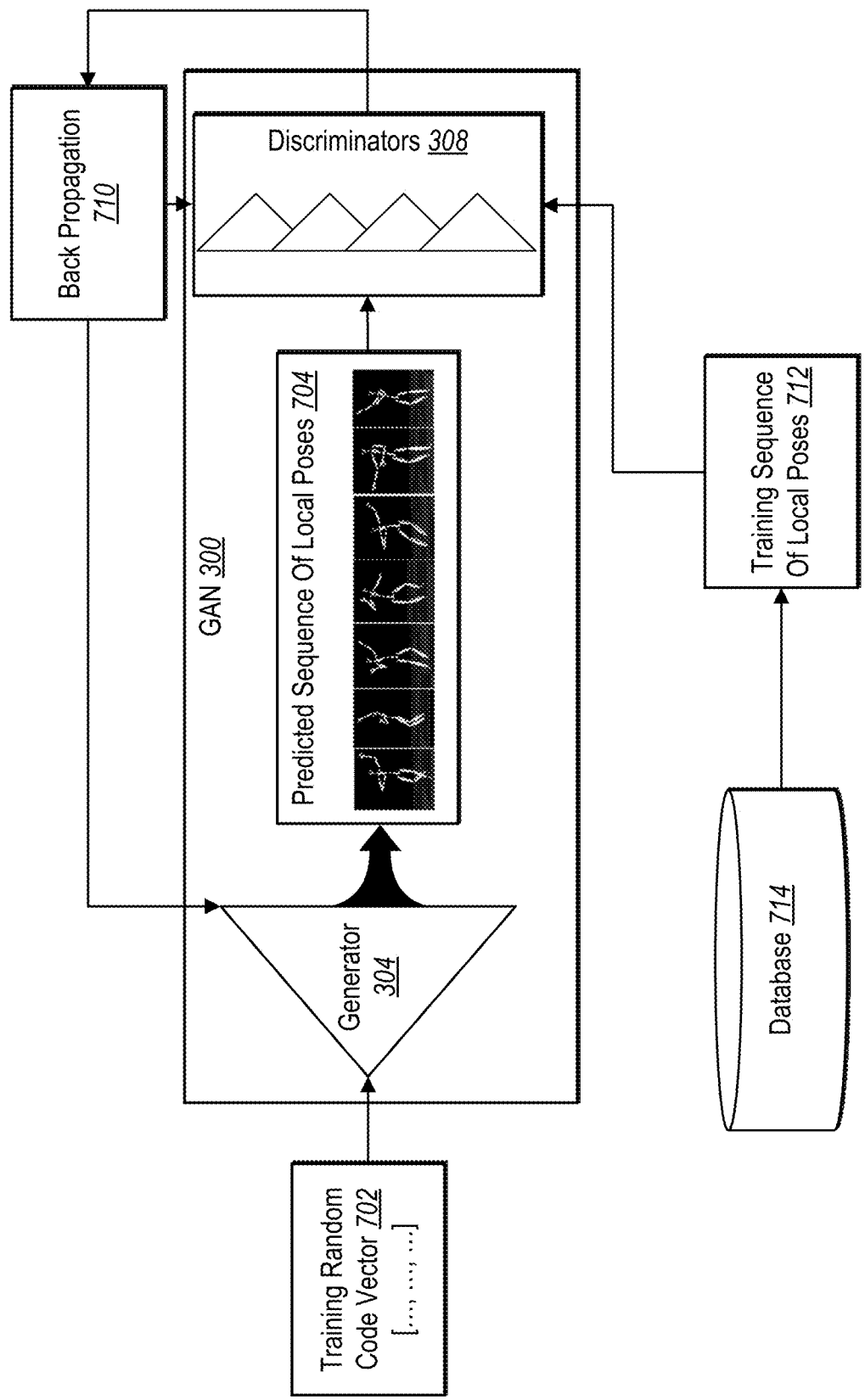
FIG. 7 illustrates a method of training an unconditional generative adversarial network in accordance with one or more embodiments.

As mentioned, the animation generation system 102 can train a GAN to generate or predict accurate sequences of local poses based on an input of a random code vector. FIG. 7 illustrates an example training process for training the GAN 300 based on training data such as training random code vectors and training sequences of local poses. As illustrated, the animation generation system 102 utilizes a training random code vector 702 to input into the GAN 300. In some embodiments, the animation generation system 102 generates, accesses, or retrieves the training random code vector 702. For example, the animation generation system 102 can utilize a non-deterministic number generation algorithm to create the random code vector 702. The animation generation system can also receive the random code vector (e.g., from a database such as the database 714 or the database 114).

Upon identifying the training random code vector 702, the generator neural network 304 generates a predicted sequence of local poses 704. Indeed, as described above, the generator neural network 304 generates a sequence of frames including depictions of joint positions of a digital animation character relative to a hip position. Based on the predicted sequence of local poses 704, the animation generation system 102 utilizes the discriminator neural networks 308 to determine a selected sequence of local poses 704.

To elaborate, the animation generation system 102 applies the discriminator neural networks 308 to select between the predicted sequence of local poses 704 and a training sequence of local poses 712 identified from a database 714 (e.g., a repository of digital animation sequences such as the Carnegie Mellon University or "CMU" Captured Motion Data set of animations). Indeed, the discriminator neural networks 308 discern between authentic (non-generated) and generated sequences of local poses by comparing the predicted sequence of local poses 704 with the training sequence of local poses 712 to determine which sequence is authentic or genuine (i.e., to determine which sequence comes from the database 714).

The animation generation system trains the generator neural network 304 (and the discriminator neural network 308) based on the output of the discriminator neural network 308 (e.g., the prediction of which sequence is authentic and/or a predicted difference measurement between the authentic and synthetic animations). For instance, the discriminator neural networks 308 take each consecutive frame of the synthesized predicted sequence of local poses 704 (e.g., 128 frames for a 128-code random code vector input) and determine a difference, such as the Wasserstein distance, between those frames and corresponding frames of the authentic training sequence of local poses 712. The animation generation system 102 then trains the generator neural network 304 based on the Wasserstein distance (e.g., by minimizing the Wasserstein Distance). Similarly, the animation generation system 102 can train the discriminator neural network 304 based on the Wasserstein distance (e.g., by maximizing the Wasserstein Distance).

Indeed, as shown, the animation generation system 102 back propagates to modify parameters or weights of both the generator neural network 304 and the discriminator neural networks 308. For example, the animation generation system 102 modifies weights associated with particular neurons or layers of the generator neural network 304 to improve the accuracy of generator neural network 304 (e.g., to reduce the Wasserstein Distance or some other measure of loss).s. Similarly, the animation generation system 102 modifies weights associated with particular neurons or layers of the discriminator neural networks 308 to improve the accuracy of the discriminator neural networks 308.

By repeating the process illustrated in FIG. 7 for multiple iterations or epochs, the animation generation system 102 improves the accuracy of the GAN 300. Indeed, the animation generation system 102 identifies training random code vectors and corresponding training sequences of local poses for each subsequent training iteration and back propagation 710 to iteratively modify weights until the error or measure of loss associated with the GAN 300 is below a threshold error or loss (or until satisfying a threshold number of iterations).

The animation generation system 102 can train the GAN 300 to generate sequences of local poses for animations of particular types of movement such as martial arts sequences or dance sequences. For example, the animation generation system 102 trains the GAN 300 by accessing and utilizing, from the database 714, particular training sequences of local poses (e.g., the training sequence of local poses 712) that reflect the type of motion desired. Thus, the animation generation system 102 can utilize a martial arts training database to train the GAN 300 to generate martial arts animations. Similarly, the animation generation system can utilize a dance database to train the GAN to generate dance animations.

Figure 8:
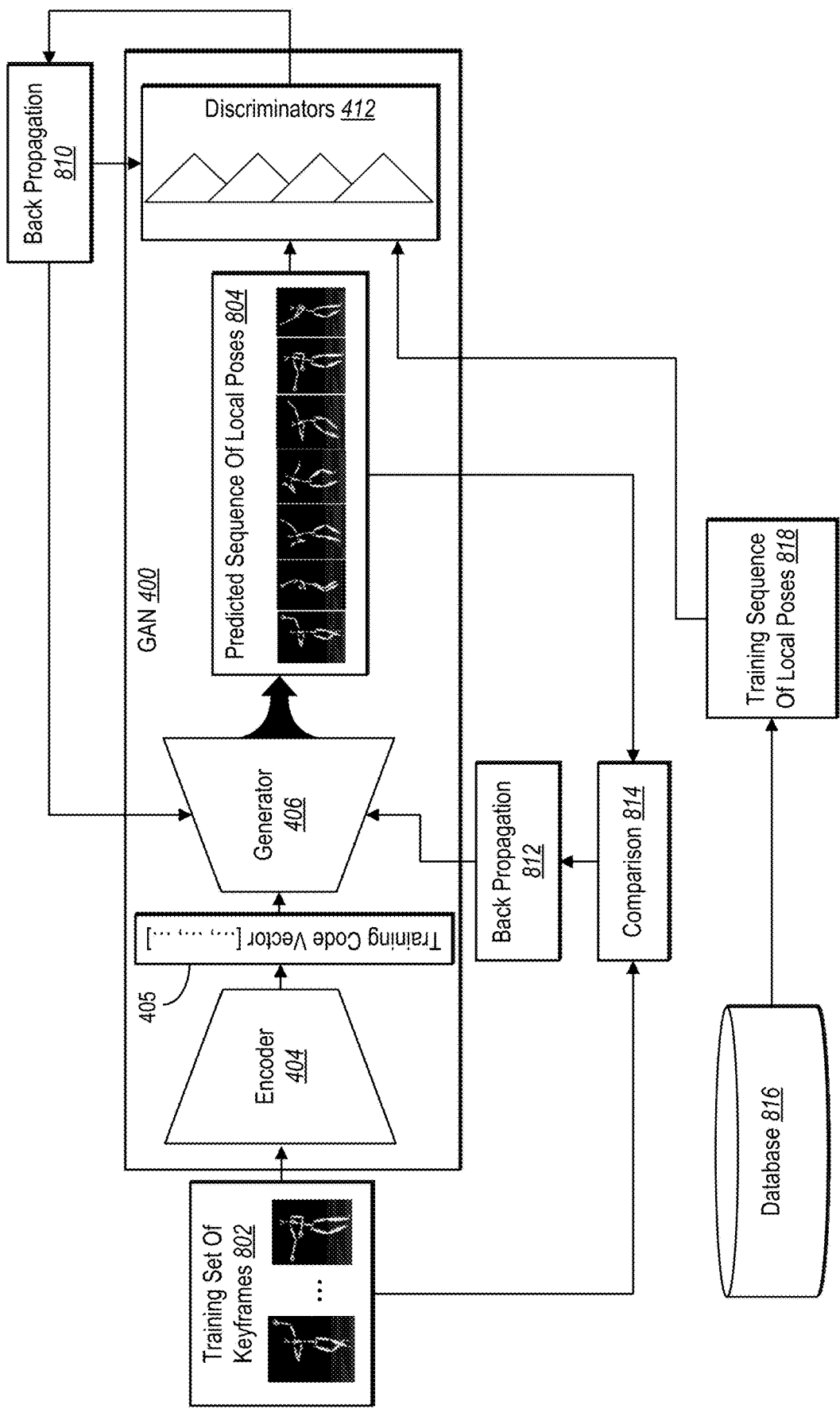
FIG. 8 illustrates a method of training a conditional generative adversarial network in accordance with one or more embodiments.

As mentioned, the animation generation system 102 can train a GAN to generate accurate sequences of local poses based on an input of a set of keyframes. FIG. 8 illustrates an example training process for training the GAN 400 based on training key frames and training sequences of local poses. As illustrated, the animation generation system 102 utilizes a training set of keyframes 802 as input into the GAN 400. In some embodiments, the animation generation system 102 generates the set of keyframes 802. In some embodiments, the animation generation system 102 accesses or retrieves the training set of keyframes 802 from a database such as the database 816 (e.g., the database 114). In these or other embodiments, the database 816 includes a particular training data such as the CMU dataset.

Based on identifying the training set of keyframes 802, the encoder neural network 404 generates a code vector from the training set of keyframes 802. Indeed, the encoder neural network 404 generates a training code vector 405 that includes a vector representation of the training set of keyframes 802 (e.g., a feature vector). Further, the animation generation system 102 provides the training code vector 405 to the generator neural network 406.

Upon receiving the training code vector 405, the generator neural network 406 generates a predicted sequence of local poses 804. Indeed, as described above, the generator neural network 406 generates a sequence of frames including depictions of joint positions of a digital animation character relative to a hip position. In addition, the animation generation system 102 performs a comparison 814 to compare the predicted sequence of local poses 804 with the training set of keyframes 802. For instance, the animation generation system 102 compares the predicted sequence of local poses 804 with the training set of keyframes 802 to determine an error or a measure of loss associated with the generator neural network 406. By determining the measure of loss, the animation generation system 102 determines how accurately the generator neural network 406 generates a predicted sequence of local poses 804 that aligns with the training set of keyframes 802. Indeed, the animation generation system 102 determines the accuracy of frames of the predicted sequence of local poses 804 reflecting local poses (e.g., joint positions) of a digital animation character depicted within corresponding keyframes (e.g., keyframes that occur at corresponding times or instances within the sequence) of the set of keyframes 802.

In addition to performing the comparison 814, the animation generation system 102 further performs a back propagation 812 based on the determined error or measure of loss. The animation generation system 102 performs the back propagation 812 by modifying weights associated with the generator neural network 406 to reduce or minimize the measure of loss. Thus, by modifying the weights of the generator neural network 406, the animation generation system 102 improves the accuracy of the generator neural network 406 in generating predicted sequences of local poses. For subsequent training iterations or epochs, the animation generation system 102 repeats the comparison 814 and the back propagation 812 to improve the accuracy of the generator neural network 406 until the accuracy satisfies a threshold accuracy—or until the measure of loss is below a threshold loss.

Based on the predicted sequence of local poses 804, the animation generation system 102 also utilizes the discriminator neural networks 412 to train the generator 406. As described above, the animation generation system 102 can analyze the predicted sequence of local poses 804 and the training sequence of local poses via the discriminator neural networks 412 and try to distinguish between the (authentic) training sequence and the (synthetic) predicted sequence of local poses 804. The discriminator neural networks 412 can generate a prediction regarding the authentic and/or synthetic sequence (e.g., predict the authentic sequence and/or predict a measure of distance between the sequences). For instance, in some embodiments, the discriminator neural networks 412 take each consecutive frame of the synthesized predicted sequence of local poses 804 (e.g., 128 frames) and determine the Wasserstein distance between those frames and corresponding frames of the authentic training sequence of local poses 818.

The animation generation system can utilize the output of the discriminator neural networks 412 to train the generator neural network 406 (and/or the discriminator neural networks 412). In particular, the animation generation system 102 back propagates to modify parameters or weights of both the generator neural network 406 and the discriminator neural networks 412. For example, the animation generation system 102 modifies weights associated with particular neurons or layers of the generator neural network 406 to alter the analysis of the generator neural network 406 in an effort to improve the accuracy of generating more realistic predicted sequences of local poses based on training sets of keyframes. Similarly, the animation generation system 102 modifies weights associated with particular neurons or layers of the discriminator neural networks 412 to alter the analysis of the discriminator neural networks 412 (which share the same weights) to improve the accuracy of flagging synthetic sequences and selecting authentic sequences. As mentioned above, the animation generation system 102 can iteratively repeat the process illustrated in FIG. 8 for multiple iterations or epochs to improve the accuracy of the GAN 400.

In one or more embodiments, the animation generation system 102 can train the GAN 400 by applying noise vectors. For example, the animation generation system 102 can train the GAN 400 using noise vectors to modify training sets of keyframes (e.g., the training set of keyframes 802). Indeed, in some embodiments the animation generation system 102 applies a noise vector to the training set of keyframes 802 to generate a modified training set of keyframes. Based on providing the modified training set of keyframes to the GAN 400, the animation generation system 102 utilizes the encoder neural network 404 to encode the modified training set of keyframes into a modified training code vector. The generator neural network 406 then analyzes the modified training code vector to generate a modified predicted sequence of local poses which the discriminator neural networks 412 compare with a training sequence of local poses, in line with the above discussion.

As mentioned, the animation generation system 102 can train a hip motion prediction network to generate accurate sequences of global poses (and/or sequences of hip velocities). FIG. 9 illustrates an example process for training the hip motion prediction network 208 to generate or predict accurate sequences of global poses based on sequences of local poses. As illustrated, the animation generation system 102 identifies a training sequence of local poses 902 from a repository of training animation sequences such as the database 912 (e.g., the database 114). Indeed, to train the hip motion prediction network 208, the animation generation system 102 utilizes the database 912 to store and access animation sequences from a particular set of animations (e.g., the CMU Captured Motion Data). In addition, the animation generation system 102 provides the training sequence of local poses 902 to the hip motion prediction network 208.

In addition, the hip motion prediction network 208 analyzes the training sequence of local poses 902 based on its internal layers, neurons, and weights to generate a predicted sequence of global poses 904 (or a predicted sequence of hip velocities). Indeed, the hip motion prediction network 208 determines hip velocities corresponding to the frames of the training sequence of local poses 902 by determining displacements of hip position between consecutive frames and determines global poses based on the hip velocities and a given initial position. As shown, the animation generation system 102 further performs a comparison 906 to compare the predicted sequence of global poses 904 with a ground truth sequence of global poses 908. For instance, the animation generation system 102 identifies the ground truth sequence of global poses 908 from the database 912, where the ground truth sequence of global poses 908 corresponds to the training sequence of local poses 902 and reflects the actual hip positions (and/or velocities) associated with the frames of the training sequence of local poses 902.

To compare the predicted sequence of global poses 904 with the ground truth sequence of global poses 908, the animation generation system 102 utilizes one or more loss functions such as a cross entropy loss function, a mean square error loss function, a Kullback-Liebler loss function, or some other appropriate loss function. In some embodiments, the animation generation system 102 utilizes multiple loss functions when training the hip motion prediction network 208.

For example, the animation generation system 102 utilizes different loss functions for different comparisons of different frames across different frame intervals. To illustrate, the animation generation system 102 determines a first displacement (e.g., a three-dimensional coordinate difference in hip position) between a first frame and a second frame within the ground truth sequence of global poses 908. The animation generation system 102 can also determine a second displacement between a corresponding first frame (e.g., a corresponding frame that occurs at the same time or frame number) and a corresponding second frame within the predicted sequence of global poses 904. The animation generation system 102 compares the first displacement and the second displacement utilizing a first loss function to determine a first measure of loss.

In addition, the animation generation system 102 determines additional displacements for other frames as well. For example, the animation generation system 102 determines displacements and corresponding measures of loss between a first frame and a third frame. The differences between the first frame and subsequent frames used to determine a measure of loss can have a variety of frame intervals. For example, the animation generation system 102 can compare frames at intervals of four (e.g., an initial frame in a sequence and the fourth frame in the sequence), eight (e.g., an initial frame and the eighth frame in the sequence), sixteen (e.g., an initial frame and a sixteenth frame), thirty-two (e.g., an initial frame and a thirty-second frame), and/or sixty-four (e.g., an initial frame and a sixty-fourth frame). By utilizing multiple loss functions in this manner, the animation generation system 102 reduces or prevents accumulative errors.

As shown, the animation generation system 102 also performs a back propagation 910. In particular, the animation generation system 102 back propagates to modify weights associated with the hip motion prediction network 208 to reduce or minimize one or more of the measures of loss that result from the application of multiple loss functions in the comparison 906. For example, the animation generation system 102 modifies weights associated with particular neurons and/or layers within the hip motion prediction network 208 to reduce the measure(s) of loss. Thus, upon repeating the process illustrated in FIG. 9 for multiple iterations or epochs (using different training sequences of local poses and corresponding ground truth sequences of global poses), the animation generation system 102 improves the accuracy of the hip motion prediction network 208 in generating predicted sequences of global poses.

Additionally, the animation generation system 102 can train the hip motion prediction network 208 to generate sequences of global poses for animations of particular types of movement such as martial arts sequences or dance sequences. For example, the animation generation system 102 trains the hip motion prediction network 208 by accessing and utilizing, from the database 912, particular ground truth sequences of global poses (e.g., the ground truth sequence of global poses 908) that reflect the type of motion desired (e.g., a training sequence of global poses that reflects hip velocities and/or positions for a dance sequence or hip velocities and/or positions for a martial arts sequence).

Figure 10:
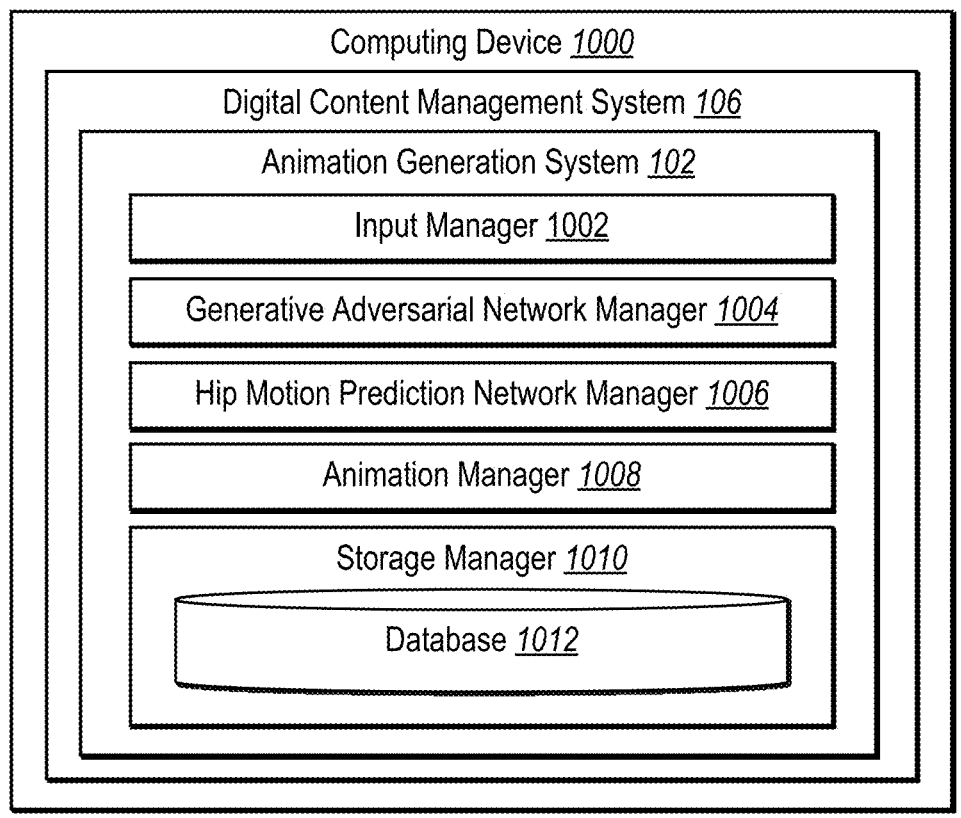
FIG. 10 illustrates a schematic diagram of an animation generation system in accordance with one or more embodiments.

Looking now to FIG. 10, additional detail will be provided regarding components and capabilities of the animation generation system 102. Specifically, FIG. 10 illustrates an example schematic diagram of the animation generation system 102 on an example computing device 1000 (e.g., one or more of the user device 108 and/or the server(s) 104). As shown in FIG. 10, the animation generation system 102 may include an input manager 1002, a generative adversarial network manager 1004 (or "GAN manager 1004"), a hip motion prediction network manager 1006, an animation manager 1008, and a storage manager 1010.

As just mentioned, the animation generation system 102 includes an input manager 1002. In particular, the input manager 1002 manages, maintains, receives, monitors, accesses, or identifies information for input into one or more of a GAN (e.g., the GAN 300 or the GAN 400) or a hip motion prediction network (e.g., the hip motion prediction network 208). For example, the input manager 1002 communicates with the storage manager 1010 to access or obtain data to use as input such as a random code vector or a set of keyframes. The input manager 1002 also communicates with the GAN manager 1004 and/or the hip motion prediction network manager 1006 to provide input for generating corresponding sequences of local poses and/or sequences of global poses.

As shown, the animation generation system 102 also includes a GAN manager 1004. In particular, the GAN manager 1004 manages, maintains, applies, utilizes, or implements one or more GANs (e.g., the GAN 300 or the GAN 400) to generate sequences of local poses of digital animation characters in accordance with the above description. In addition, the GAN manager 1004 trains one or more GANs to generate accurate predictions of sequences of local poses in accordance with the disclosure herein. For example, the GAN manager 1004 communicates with the storage manager 1010 to access training data from the database 1012 (e.g., the database 912, 816, 714, or 114) to train a GAN.

As further shown, the animation generation system 102 includes a hip motion prediction network manager 1006. In particular, the hip motion prediction network manager 1006 manages, maintains, applies, utilizes, or implements a hip motion prediction network to generate sequences of global poses (or hip velocities) of digital animation characters, in accordance with this description. In addition, the hip motion prediction network manager 1006 trains a hip motion prediction network (e.g., the hip motion prediction network 208) to generate accurate predictions of sequences of global poses in accordance with this disclosure. For example, the hip motion prediction network manager 1006 communicates with the storage manager 1010 to access training data from the database 1012 to train a hip motion prediction network.

Additionally, the animation generation system 102 includes an animation manager 1008. In particular, the animation manager 1008 manages, generates, determines, or produces digital animations of digital animation characters as sequences of frames. For example, the animation manager 1008 communicates with the hip motion prediction network manager 1006 and/or the GAN manager 1004 to generate an animation of a digital animation character that reflects the determined local and global poses of each of the frames in the corresponding sequences.

In one or more embodiments, each of the components of the animation generation system 102 are in communication with one another using any suitable communication technologies. Additionally, the components of the animation generation system 102 can be in communication with one or more other devices including one or more user devices described above. It will be recognized that although the components of the animation generation system 102 are shown to be separate in FIG. 10, any of the subcomponents may be combined into fewer components, such as into a single component, or divided into more components as may serve a particular implementation. Furthermore, although the components of FIG. 10 are described in connection with the animation generation system 102, at least some of the components for performing operations in conjunction with the animation generation system 102 described herein may be implemented on other devices within the environment.

The components of the animation generation system 102 can include software, hardware, or both. For example, the components of the animation generation system 102 can include one or more instructions stored on a computer-readable storage medium and executable by processors of one or more computing devices (e.g., the computing device 1000). When executed by the one or more processors, the computer-executable instructions of the animation generation system 102 can cause the computing device 1000 to perform the methods described herein. Alternatively, the components of the animation generation system 102 can comprise hardware, such as a special purpose processing device to perform a certain function or group of functions. Additionally or alternatively, the components of the animation generation system 102 can include a combination of computer-executable instructions and hardware.

Furthermore, the components of the animation generation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the animation generation system 102 may be implemented as part of a stand-alone application on a personal computing device or a mobile device. Alternatively or additionally, the components of the animation generation system 102 may be implemented in any application that allows creation and delivery of marketing content to users, including, but not limited to, applications in ADOBE CREATIVE CLOUD, such as ADOBE ILLUSTRATOR, ADOBE PHOTOSHOP, and ADOBE PREMIERE. "ADOBE," "ADOBE ILLUSTRATOR," "ADOBE PHOTOSHOP," and "ADOBE PREMIERE" are trademarks of Adobe Inc. in the United States and/or other countries.

FIGS. 1-10, the corresponding text, and the examples provide a number of different systems, methods, and non-transitory computer readable media for generating an animation of a digital animation character utilizing a GAN and a hip motion prediction network. In addition to the foregoing, embodiments can also be described in terms of flowcharts comprising acts for accomplishing a particular result. For example, FIG. 11 illustrates a flowchart of an example sequence of acts in accordance with one or more embodiments.

Figure 11:
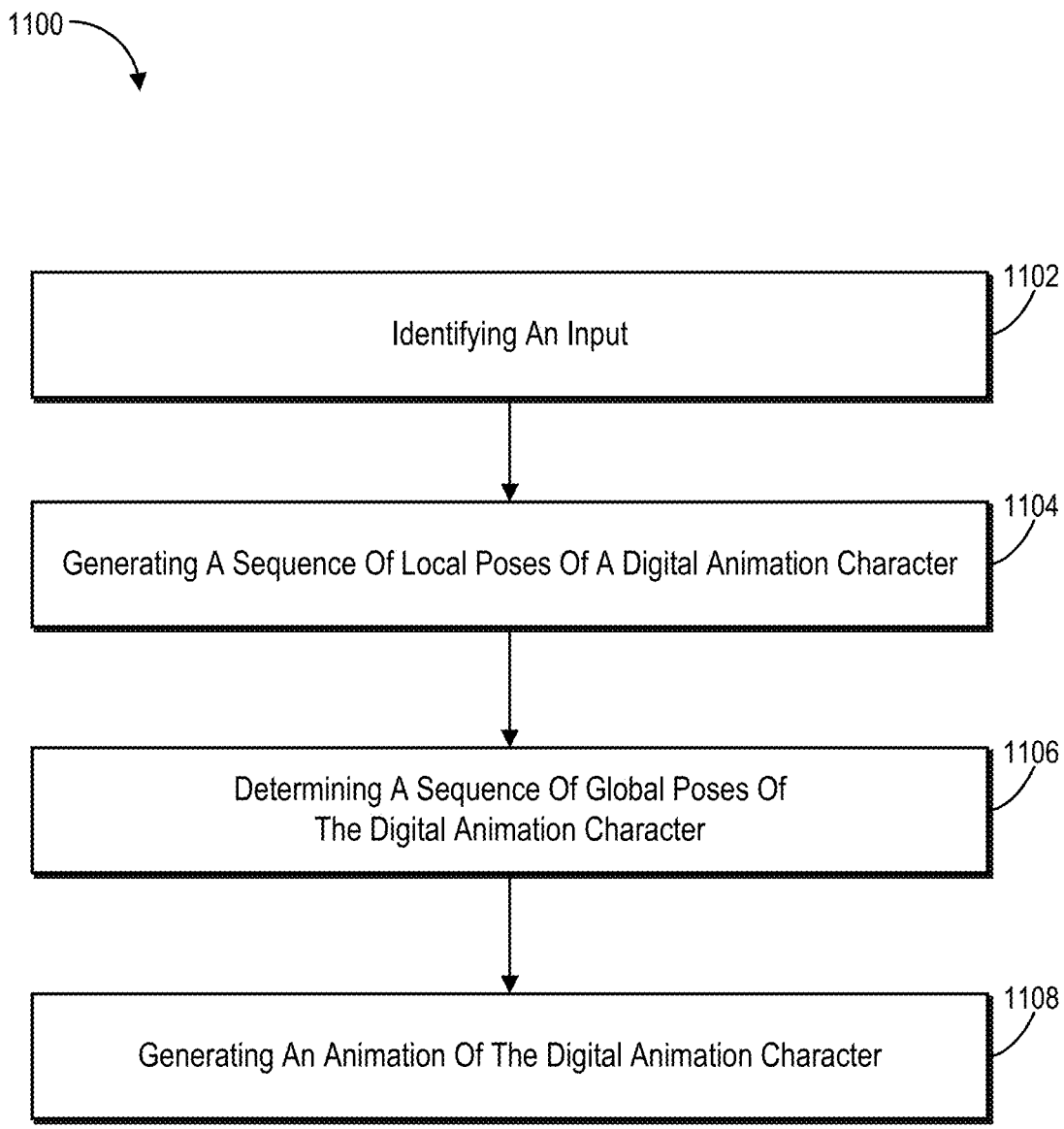
FIG. 11 illustrates a flowchart of a series of acts for generating an animation by utilizing a generative adversarial network and a hip motion prediction network in accordance with one or more embodiments.

While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 for generating an animation of a digital animation character utilizing a GAN and a hip motion prediction network. The series of acts 1100 includes an act 1102 of identifying an input. In particular, the act 1102 can include identifying a code vector for generating an animation sequence of a digital animation character. In some embodiments, the act 1102 can include identifying a set of keyframes for generating an animation sequence of a digital animation character, wherein the set of keyframes defines specific global poses for the digital animation character at particular frames during the animation sequence. Identifying a code vector can include identifying a random code vector for generating a random animation sequence of the digital animation character or generating the code vector based on a set of keyframes that define specific global poses for the digital animation character at particular frames during the animation sequence. Indeed, the input can include a random code vector or a set of keyframes.

The series of acts 1100 can include an act 1104 of generating a sequence of local poses of a digital animation character. In particular, the act 1104 can include utilizing a generative adversarial network to generate a sequence of local poses of the digital animation character based on the code vector. For example, the act 1104 can involve utilizing the generative adversarial network to generate the sequence of local poses by analyzing the code vector to determine a sequence of three-dimensional joint positions relative to root joint (e.g., hip) positions of the digital animation character. Additionally (or alternatively), the act 1104 can involve utilizing a generative adversarial network to generate a sequence of local poses of the digital animation character based on the set of keyframes, wherein the local poses comprise joint positions relative to root joint (e.g., hip) positions of the digital animation character.

As shown, the series of acts 1100 includes an act 1106 of determining a sequence of global poses of the digital animation character. In particular, the act 1106 can include determining, by utilizing a root joint (or hip) motion prediction network, a sequence of global poses of the digital animation character based on the sequence of local poses.

For example, the act 1106 can involve determining the sequence of global poses by utilizing the hip motion prediction network to determine a sequence of hip velocities of the digital animation character based on the sequence of three-dimensional joint positions. A root joint (e.g., hip) velocity can include a displacement of a root joint (e.g., hip) position between two consecutive frames of the digital animation. The sequence of global poses can include a random sequence of global poses for animating the digital animation character. In some embodiments, the sequence of global poses aligns with the set of keyframes such that, at frames within the sequence of global poses that correspond to keyframes within the set of keyframes, the digital animation character reflects global poses depicted by the keyframes. Additionally (or alternatively), the act 1106 can involve determining, by utilizing a hip motion prediction network, a sequence of global poses of the digital animation character based on the sequence of local poses, wherein the sequence of global poses align with the set of keyframes.

As further shown, the series of acts 1100 includes an act 1108 of generating an animation of the digital animation character. In particular, the act 1108 can include generating an animation of the digital animation character reflecting the sequence of global poses.

The series of acts 1100 can also include an act of utilizing an encoder neural network to encode the set of keyframes into a code vector for input into the generative adversarial network. The series of acts 1100 can also include an act of training the generative adversarial network to generate predicted sequences of local poses based on a repository of training animation sequences. The generative adversarial network can include a fully-convolutional neural network. Also, the root joint (e.g., hip) motion prediction network can include a convolutional neural network. The series of acts 1100 can also include an act of training the generative adversarial network by utilizing a generator neural network to analyze a training code vector corresponding to a training set of keyframes to generate a predicted sequence of local poses and comparing the predicted sequence of local poses with the training set of keyframes to determine a first measure of loss associated with the generator neural network.

Training the generative adversarial network can include identifying a training sequence of local poses from a repository of training animation sequences, utilizing the discriminator neural network to select a predicted training sequence from the predicted sequence of local poses and the training sequence of local poses, comparing the predicted training sequence with the training sequence of local poses to determine a second measure of loss, and modifying parameters associated with the generator neural network and the discriminator neural network based on first measure of loss and the second measure of loss. The series of acts 1100 can include an act of training the hip motion prediction network by utilizing the hip motion prediction network to generate a predicted sequence of global poses based on a training sequence of local poses, comparing the predicted sequence of global poses with a ground truth sequence of global poses to determine a measure of loss associated with the hip motion prediction network, and modifying one or more parameters of the hip motion prediction network based on the measure of loss.

The series of acts 1100 can further include an act of generating a modified code vector by applying a noise vector to the code vector. In addition, the series of acts 1100 can include an act of utilizing the generative adversarial network to generate a modified sequence of local poses of the digital animation character based on the modified code vector. The series of acts 1100 can also include an act of determining, by utilizing a hip motion prediction network, a modified sequence of global poses of the digital animation character based on the modified sequence of local poses. Additionally, the series of acts 1100 can include an act of generating a modified animation of the digital animation character reflecting the modified sequence of global poses.

Additionally, the series of acts 1100 can include an act of comparing the predicted sequence of global poses with the training sequence of global poses. Comparing the predicted sequence of global poses with the training sequence of global poses can include determining a first displacement between a first frame and a second frame in the ground truth sequence of global poses, determining second displacement between a corresponding first frame and a corresponding second frame in the predicted sequence of global poses, and comparing the first displacement and the second displacement to determine a first measure of loss. Comparing the predicted sequence of global poses with the training sequence of global poses can further include determining a third displacement between a first frame and a third frame in the ground truth sequence of global poses, determining fourth displacement between the corresponding first frame and a corresponding third frame in the predicted sequence of global poses, and comparing the first displacement and the second displacement to determine a second measure of loss.

In some embodiments, the series of acts 1100 includes a step for utilizing a generative adversarial network to generate a sequence of global poses of the digital animation character based on the input. For example, the acts and algorithms described above with reference to FIGS. 2, 5, and 6 can comprise the corresponding structure for performing a step for utilizing a generative adversarial network to generate a sequence of global poses of the digital animation character based on the input.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
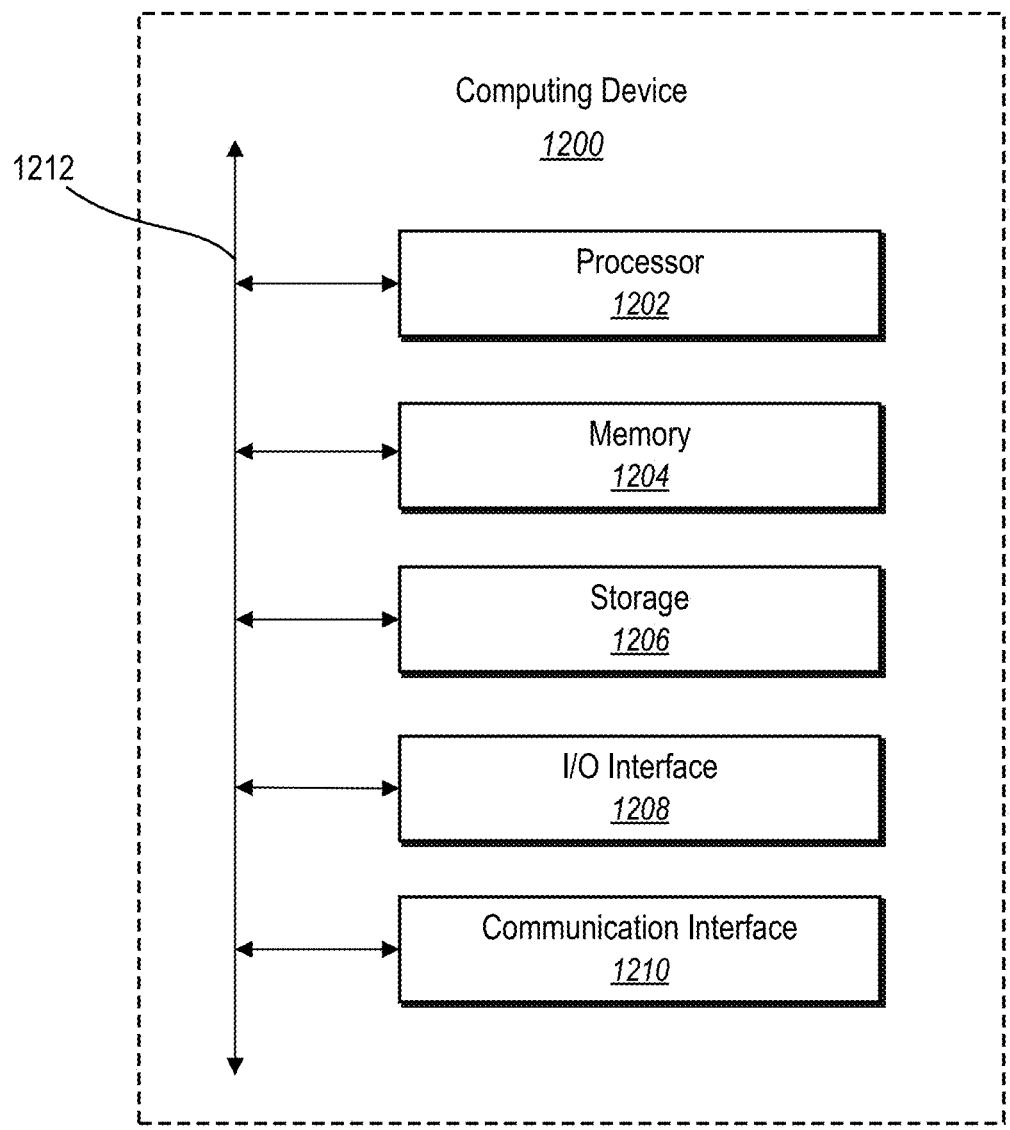
FIG. 12 illustrates a block diagram of an example computing device in accordance with one or more embodiments.

FIG. 12 illustrates, in block diagram form, an example computing device 1200 (e.g., the computing device 1000, the user device 108, and/or the server(s) 104) that may be configured to perform one or more of the processes described above. One will appreciate that the animation generation system 102 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computer device to:
    identify a code vector for generating an animation sequence of a digital animation character;
    generate a sequence of local poses indicating positions of joints relative to a root joint of the digital animation character by processing the code vector using a generative adversarial network;
    utilize a root joint motion prediction network to determine a sequence of hip joint velocities and a sequence of global poses of the digital animation character corresponding to the hip joint velocities from the sequence of local poses; and
    generate an animation of the digital animation character reflecting the sequence of global poses.

2. The non-transitory computer readable medium of claim 1, further comprising instructions that, when executed by the at least one processor, cause the computer device to identify the code vector by one or more of:
    identifying a random code vector for generating a random animation sequence of the digital animation character; or
    generating the code vector based on a set of keyframes that define particular global poses for the digital animation character at particular frames during the animation sequence.

3. The non-transitory computer readable medium of claim 1, wherein:
    the generative adversarial network comprises a fully-convolutional neural network; and
    the root joint motion prediction network comprises a convolutional neural network.

4. The non-transitory computer readable medium of claim 1, further comprising instructions that, when executed by the at least one processor, cause the computer device to utilize the generative adversarial network to generate the sequence of local poses by analyzing the code vector to determine a sequence of three-dimensional joint positions relative to root joint positions of the digital animation character.

5. The non-transitory computer readable medium of claim 4, further comprising instructions that, when executed by the at least one processor, cause the computer device to determine the sequence of global poses by utilizing the root joint motion prediction network to determine a sequence of root joint coordinate locations within a global reference frame.

6. The non-transitory computer readable medium of claim 1, wherein a hip velocity comprises a displacement of a hip position between two frames of the animation.

7. The non-transitory computer readable medium of claim 1, further comprising instructions that, when executed by the at least one processor, cause the computer device to train the generative adversarial network to generate predicted sequences of local poses based on a repository of training animation sequences.

8. A system comprising:
    at least one processor; and
    a non-transitory computer readable medium comprising instructions that, when executed by the at least one processor, cause the system to:
        identify a set of keyframes for generating an animation sequence of a digital animation character, wherein the set of keyframes defines particular global poses for the digital animation character at particular frames during the animation sequence;
        generate a sequence of local poses indicating joint positions relative to root joint positions of the digital animation character by processing the set of keyframes using a generative adversarial network;
        utilize a root joint motion prediction network to determine a sequence of hip joint velocities and a sequence of global poses of the digital animation character corresponding to the hip joint velocities from the sequence of local poses, wherein the sequence of global poses align with the set of keyframes; and generate an animation of the digital animation character reflecting the sequence of global poses.

9. The system of claim 8, further comprising instructions that, when executed by the at least one processor, cause the system to utilize an encoder neural network to encode the set of keyframes into a code vector for input into the generative adversarial network.

10. The system of claim 9, further comprising instructions that, when executed by the at least one processor, cause the system to:

generate a modified code vector by applying a noise vector to the code vector;

utilize the generative adversarial network to generate a modified sequence of local poses of the digital animation character based on the modified code vector;

determine, by utilizing the root joint motion prediction network, a modified sequence of hip joint velocities and a modified sequence of global poses of the digital animation character corresponding to the modified sequence of hip joint velocities based on the modified sequence of local poses; and generate a modified animation of the digital animation character reflecting the modified sequence of global poses.

11. The system of claim 8, further comprising instructions that, when executed by the at least one processor, cause the system to determine the sequence of global poses by utilizing the root joint motion prediction network to determine a sequence of root joint coordinate locations within a global reference frame.

12. The system of claim 8, wherein the generative adversarial network comprises a generator neural network and a discriminator neural network, and further comprising instructions that, when executed by the at least one processor, cause the system to train the generative adversarial network by:

utilizing a generator neural network to analyze a training code vector corresponding to a training set of keyframes to generate a predicted sequence of local poses; and comparing the predicted sequence of local poses with the training set of keyframes to determine a first measure of loss associated with the generator neural network.

13. The system of claim 12, further comprising instructions that, when executed by the at least one processor, cause the system to train the generative adversarial network by:

identifying a training sequence of local poses from a repository of training animation sequences;

utilizing the discriminator neural network to determine a difference between the predicted sequence of local poses and the training sequence of local poses; and modifying parameters associated with the generator neural network and the discriminator neural network based on the determined difference.

14. The system of claim 8, further comprising instructions that, when executed by the at least one processor, cause the system to train the hip root joint motion prediction network by:

utilizing the root joint motion prediction network to generate a predicted sequence of global poses based on a training sequence of local poses;

comparing the predicted sequence of global poses with a ground truth sequence of global poses to determine a measure of loss associated with the root joint motion prediction network; and modifying one or more parameters of the root joint motion prediction network based on the measure of loss.

15. The system of claim 14, further comprising instructions that, when executed by the at least one processor, cause the system to compare the predicted sequence of global poses with the training sequence of global poses by:

determining a first displacement between a first frame and a second frame in the ground truth sequence of global poses;

determining a second displacement between a corresponding first frame and a corresponding second frame in the predicted sequence of global poses; and comparing the first displacement and the second displacement to determine a first measure of loss.

16. The system of claim 15, further comprising instructions that, when executed by the at least one processor, cause the system to compare the predicted sequence of global poses with the training sequence of global poses by further:

determining a third displacement between the first frame and a third frame in the ground truth sequence of global poses;

determining a fourth displacement between the corresponding first frame and a corresponding third frame in the predicted sequence of global poses; and comparing the third displacement and the fourth displacement to determine a second measure of loss.

17. In a digital medium environment for generating animations for three-dimensional digital character representations, a computer-implemented method for utilizing generative adversarial networks to generate animated sequences, the computer-implemented method comprising:

identifying an input for generating an animation sequence of a digital animation character, the input comprising at least one of a random code vector or a set of keyframes; and a step for utilizing a generative adversarial network to generate a sequence of global poses of the digital animation character based on the input; and generating an animation having a sequence of frames reflecting the sequence of global poses.

18. The computer-implemented method of claim 17, wherein:

the input comprises the random code vector, and the sequence of global poses comprises a random sequence of global poses for animating the digital animation character.

19. The computer-implemented method of claim 17, wherein:

the input comprises the set of keyframes, and the sequence of global poses aligns with the set of keyframes such that, at frames within the sequence of global poses that correspond to keyframes within the set of keyframes, the digital animation character reflects global poses depicted by the keyframes.

20. The computer-implemented method of claim 17, further comprising:

training the generative adversarial network to generate predicted sequences of local poses based on a repository of training animation sequences; and training a hip motion prediction network to generate predicted sequences of global poses based on one or more training animation sequences.

* * * * *